(12) United States Patent
Maier et al.

(10) Patent No.: US 8,013,991 B2
(45) Date of Patent: *Sep. 6, 2011

(54) RAMAN DIFFERENCE SPECTRA BASED DISEASE CLASSIFICATION

(75) Inventors: John Maier, Pittsburgh, PA (US); Jeffrey Cohen, Pittsburgh, PA (US); Shona Stewart, Pittsburgh, PA (US)

(73) Assignee: ChemImage Corporation, Pittsburgh, PA (US)

( * ) Notice: Subject to any disclaimer, the term of this patent is extended or adjusted under 35 U.S.C. 154(b) by 362 days.

This patent is subject to a terminal disclaimer.

(21) Appl. No.: 12/188,796

(22) Filed: Aug. 8, 2008

(65) Prior Publication Data

US 2009/0040517 A1    Feb. 12, 2009

Related U.S. Application Data

(60) Provisional application No. 60/954,607, filed on Aug. 8, 2007.

(51) Int. Cl.
*G01J 3/44* (2006.01)
*G01N 21/65* (2006.01)

(52) U.S. Cl. .......................................... 356/301; 356/73
(58) Field of Classification Search .......... 356/300–334, 356/73, 402–425; 702/19
See application file for complete search history.

(56) References Cited

U.S. PATENT DOCUMENTS

| | | | |
|---|---|---|---|
| 6,002,476 A | 12/1999 | Treado | |
| 6,018,713 A | 1/2000 | Coli et al. | |
| 6,162,604 A * | 12/2000 | Jacob | ................................ 435/6 |
| 6,421,553 B1 | 7/2002 | Costa et al. | |
| 6,620,621 B1 | 9/2003 | Cohenford et al. | |
| 6,765,668 B2 | 7/2004 | Gardner et al. | |
| 6,864,093 B1 | 3/2005 | Chai et al. | |
| 6,949,342 B2 | 9/2005 | Golub et al. | |
| 7,330,747 B2 | 2/2008 | Maier | |
| 7,394,546 B2 * | 7/2008 | Vakhtin et al. | ................. 356/456 |
| 7,570,356 B2 * | 8/2009 | Panza et al. | ................... 356/301 |

(Continued)

FOREIGN PATENT DOCUMENTS

WO    WO 00/01295    1/2000

(Continued)

OTHER PUBLICATIONS

Forms PCT/ISA/220, 210, and 237 for International Application No. PCT/US2008/001988.

(Continued)

*Primary Examiner* — Sang Nguyen

(57) ABSTRACT

A method to diagnosis a disease state of an unknown sample. A test Raman data set for an unknown sample is generated. A reference Raman database is provided where the database contains a plurality of reference Raman data sets and a plurality of reference Raman difference data sets. The reference Raman difference data set is generated by determining a difference between a first reference Raman data set and a second reference Raman data set. A first reference Raman data set is associated with first known sample and associated with one or more of: a first known disease state and a first known clinical outcome. A second reference Raman data set is associated with a second known sample and associated with one or more of: a second known disease state and a second known clinical outcome. A diagnosis is provided of whether the unknown sample has a first disease state or a second disease state by comparing the test Raman dataset to said plurality of reference Raman difference data sets in the reference Raman database using a chemometric technique.

30 Claims, 32 Drawing Sheets

U.S. PATENT DOCUMENTS

| | | |
|---|---|---|
| 7,755,757 B2 * | 7/2010 | Maier et al. .................. 356/301 |
| 2005/0250091 A1 | 11/2005 | Maier et al. |
| 2005/0277816 A1 | 12/2005 | Maier et al. |
| 2006/0155195 A1 | 7/2006 | Maier et al. |
| 2006/0253261 A1 | 11/2006 | Maier et al. |
| 2006/0281068 A1 | 12/2006 | Maier et al. |
| 2007/0070343 A1 | 3/2007 | Cohen et al. |
| 2007/0153268 A1 | 7/2007 | Panza et al. |
| 2007/0178067 A1 | 8/2007 | Maier et al. |
| 2007/0182959 A1 | 8/2007 | Maier et al. |

FOREIGN PATENT DOCUMENTS

| | | |
|---|---|---|
| WO | WO2006130728 | 12/2006 |

OTHER PUBLICATIONS

U.S. Appl. No. 12/070,010; Maier et al.; filed Feb. 14, 2008.
U.S. Appl. No. 12/206,467; Stewart et al.; filed Sep. 8, 2008.
U.S. Appl. No. 12/206,500; Stewart et al.; filed Sep. 8, 2008.
PCT/US2008/072617, Oct. 16, 2008, International Search Rept.

\* cited by examiner

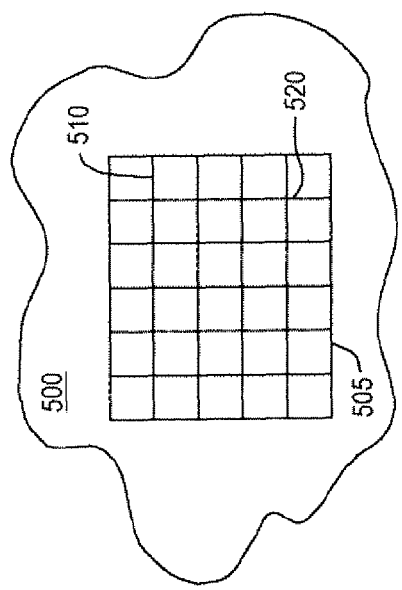
FIG. 5A
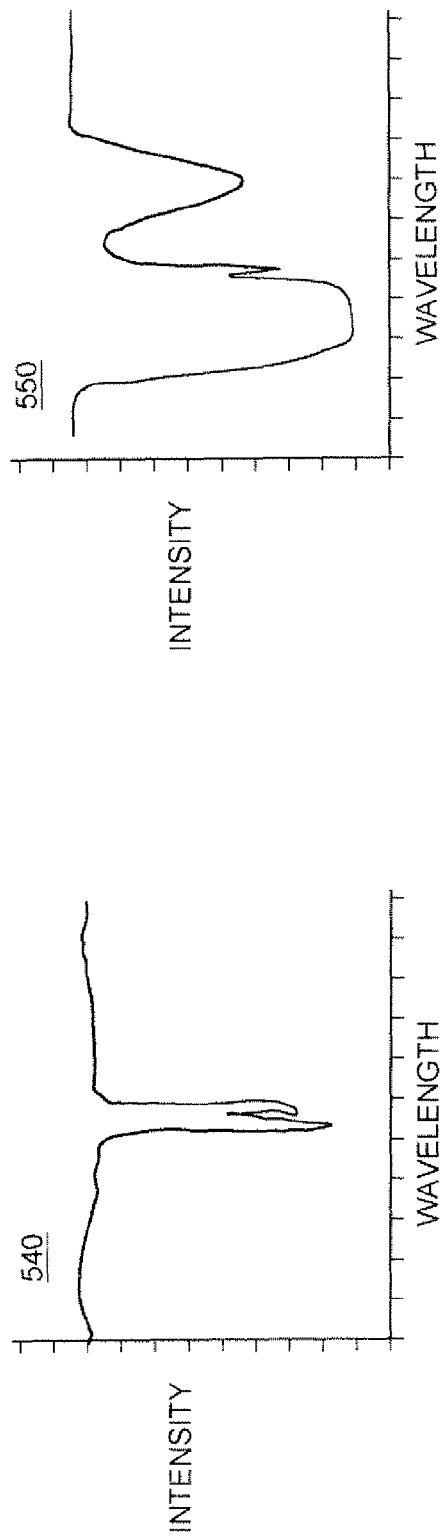
FIG. 5B
FIG. 5C

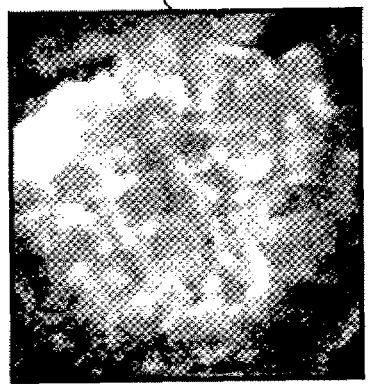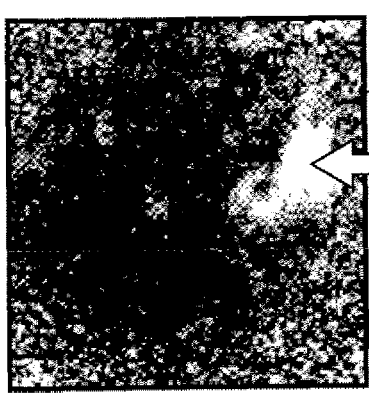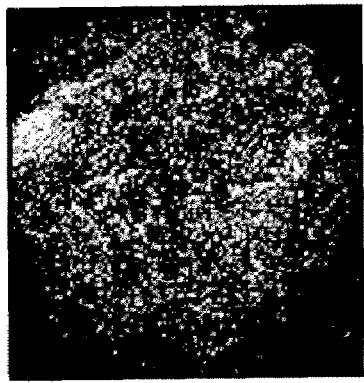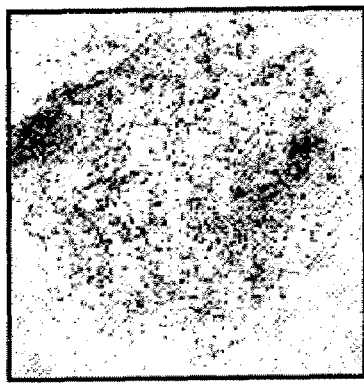
FIG. 6

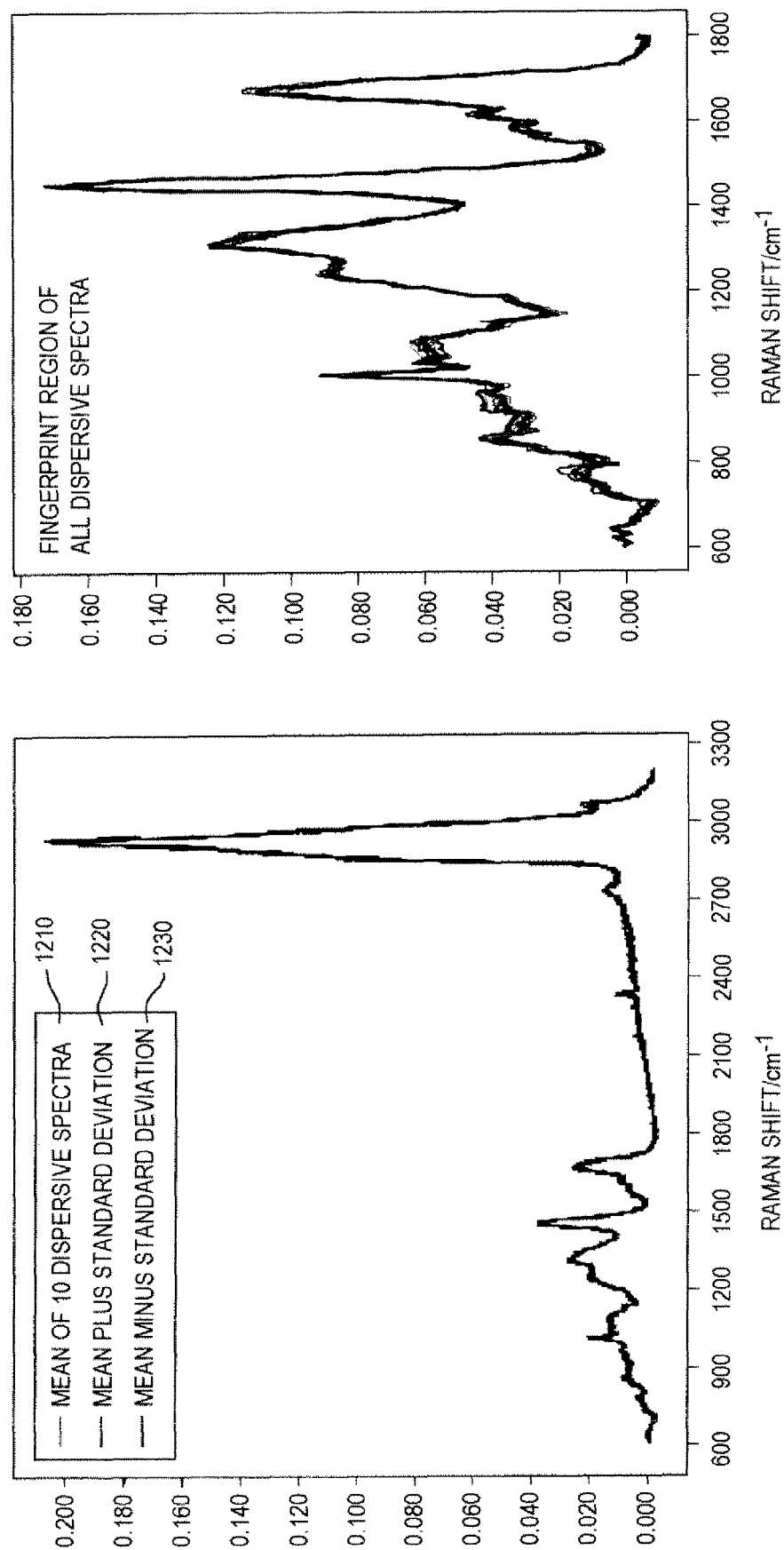

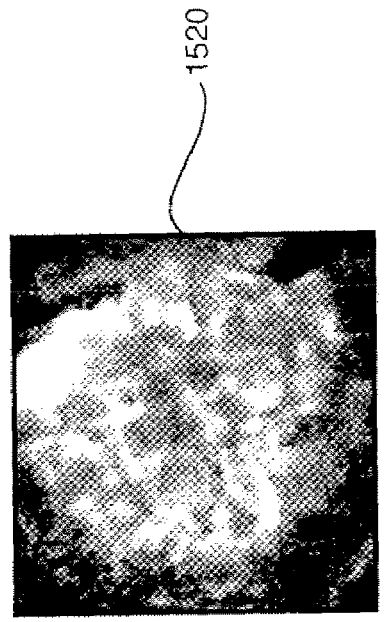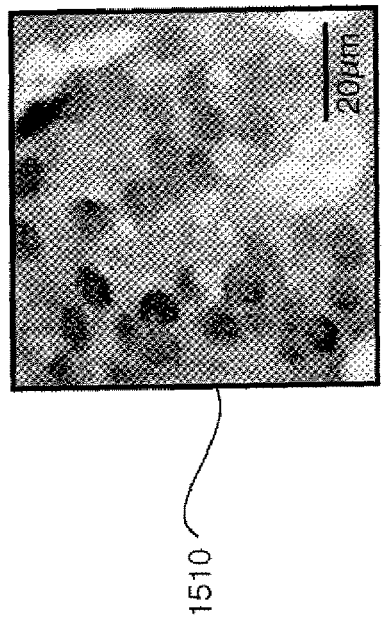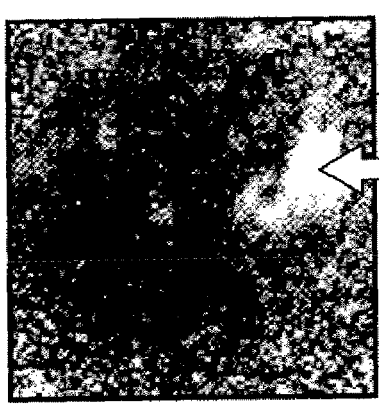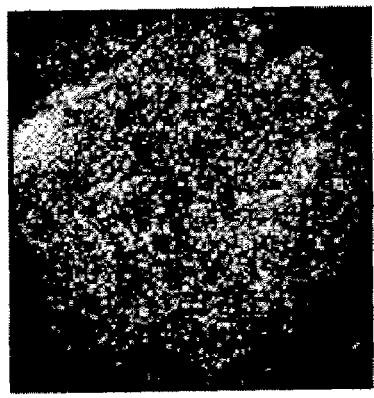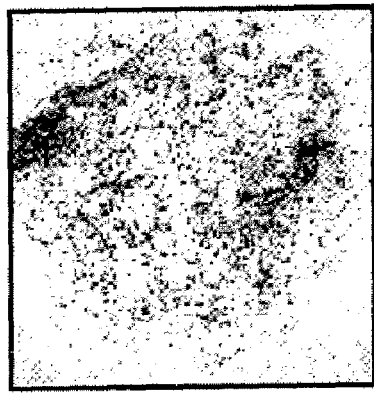
FIG. 15

RAMAN DIFFERENCE SPECTRA BASED DISEASE CLASSIFICATION

RELATED APPLICATIONS

This application claims the benefit of U.S. Provisional Application No. 60/954,607, filed Aug. 8, 2007, entitled "Gleason Score Based Cancer Tissue Analysis," which is incorporated herein by reference in its entirety.

FIELD OF DISCLOSURE

The present disclosure relates to methods and systems to use difference spectra, in particular Raman difference spectra, to identify the disease state and/or clinical outcome of target or test samples. Based on the disease state and clinical outcome, a diagnosis of progressive or non-progressive disease may be provided.

BACKGROUND

The biochemical composition of a cell is a complex mix of biological molecules including, but not limited to, proteins, nucleic acids, lipids, and carbohydrates. The composition and interaction of the biological molecules determines the metabolic state of a cell. The metabolic state of the cell will dictate the type of cell and its function (i.e., red blood cell, epithelial cell, etc.). Tissue is generally understood to mean a group of cells that work together to perform a function. Raman spectroscopic techniques provide information about the biological molecules contained in cells and tissues and therefore provide information about the metabolic state. As the cell's or tissue's metabolic state changes from the normal state to a diseased state, Raman spectroscopic techniques can provide information to indicate the metabolic change and therefore serve to diagnose and predict a disease state and clinical outcome. Cancer is a prevalent disease, so physicians are very concerned with being able to accurately diagnose cancer and to determine the best course of treatment.

The vast majority of cancer cases are pathologically diagnosed tissue from a biopsy specimen. An experienced pathologist can provide diagnostic information used to make management decisions for the treatment of the cancer. In the case of prostate cancer, the tissue sample is given a Gleason score based on the appearance of the prepared, stained tissue section which is a measure of how far from normal the tissue appears. In general, the higher the Gleason score, the more aggressive the cancer. However, there are cases where patients with a relatively low Gleason score progress to metastatic disease, and there are cases where patients with a relatively high Gleason score have a benign course. The current methods of Gleason scoring are not necessarily predictive of a clinical outcome.

Raman spectroscopy may be explored for detection of various types of cancers. Because Raman spectroscopy is based on irradiation of a sample and detection of scattered radiation, it can be employed non-invasively to analyze biological samples in situ. Thus, little or no sample preparation is required. Raman spectroscopy techniques can be readily performed in aqueous environments because water exhibits very little, but predictable, Raman scattering. It is particularly amenable to in vivo measurements as the powers and excitation wavelengths used are non-destructive to the tissue and have a relatively large penetration depth. Therefore, it is desirable to devise methodologies that use Raman spectroscopy techniques to differentiate various cell types (e.g., normal, malignant, benign, etc.), to classify biological samples under investigation (e.g., a normal tissue, a diseased tissue, etc.), and to also predict clinical outcome (e.g., progressive or non-progressive state of cancer, etc.) of a diseased cell or tissue.

SUMMARY

The present disclosure provides for a method to diagnosis a disease state of an unknown sample. A test Raman data set for an unknown sample is generated. A reference Raman database is provided where the database contains a plurality of reference Raman data sets and a plurality of reference Raman difference data sets. A reference Raman difference data set is generated by determining a difference between a first reference Raman data set and a second reference Raman data set. A first reference Raman data set is associated with first known sample and associated with one or more of: a first known disease state and a first known clinical outcome. A second reference Raman data set is associated with a second known sample and associated with one or more of: a second known disease state and a second known clinical outcome. A diagnosis is provided of whether the unknown sample has a first disease state or a second disease state by comparing the test Raman dataset to said plurality of reference Raman difference data sets in the reference Raman database using a chemometric technique.

The present disclosure further provides for a method to provide a diagnosis of a disease state of an unknown sample. A reference Raman database is provided where the database contains a plurality of reference Raman spectra, each reference Raman spectrum is associated with a known sample and one or more of: an associated known disease state and an associated known clinical outcome. An unknown sample is irradiated with substantially monochromatic light to thereby generate scattered photons. Based on the scattered photons, a test Raman image is collected from a region of interest of the unknown sample. The region of interest is defined by a plurality of x,y spatial coordinates and the test Raman image includes a plurality of test Raman spectra. Each test Raman spectrum has an associated x,y spatial coordinate of the associated region of interest. A reference Raman spectrum is selected from the reference Raman database. A test Raman difference image is determined by subtracting the selected reference Raman spectrum from each of the plurality of test Raman spectra associated with each x,y spatial coordinate and can involve normalizing the subtracted Raman spectra. A diagnosis is provided as to whether the unknown sample has a first disease state or a second disease state by comparing the test Raman difference image to at least one member of the reference Raman database using a chemometric technique.

In another embodiment, a diagnosis is provided as to whether the unknown sample has a first disease outcome or a second disease outcome based on the outcome of the comparison. In one such embodiment, a first known disease outcome corresponds to a progressive disease outcome and said second known disease outcome corresponds to a non-progressive disease outcome.

In one embodiment, the chemometric technique includes Principal Component Analysis, Minimum noise function, spectral mixture resolution, and or linear discriminant analysis.

In one such embodiment, the chemometric technique is spectral mixture resolution. In another such embodiment, the chemometric technique is Principal component Analysis in which a pre-determined vector space that mathematically describes the plurality of reference Raman difference data sets is selected. The test Raman data set is transformed into the pre-determined vector space. A distribution of the transformed test Raman data set in the pre-determined vector space is analyzed to generate a diagnosis.

In another embodiment, the test Raman data set is associated with a region of interest of the unknown sample where the associated region of interest is defined by a plurality of x,y spatial coordinates. The test Raman data set corresponds to a plurality of test Raman spectra, where each test Raman spectrum has an associated x,y spatial coordinate of the associated region of interest.

In accordance with the present disclosure, a test Raman data set is generated by irradiating an unknown sample with substantially monochromatic light to thereby generate a plurality of scattered photons; and collecting a test Raman data set based on the scattered and emitted photons. In one such embodiment, the test Raman data set is collected at a plurality of Raman shift values ranging from 500 cm$^{-1}$ to 3200 cm$^{-1}$. In another such embodiment, the test Raman data set is collected at a plurality of Raman shift values ranging from 400 cm$^{-1}$ to 1850 cm$^{-1}$.

The present disclosure further provides for a method to provide a diagnosis of a disease state of an unknown sample. A reference Raman database is provided where the database contains a plurality of reference Raman spectra, each reference Raman spectrum is associated with a known sample and one or more of: an associated known disease state and an associated known clinical outcome. The unknown sample is irradiated with substantially monochromatic light to thereby generate scattered photons. Based on the scattered photons, a test Raman image is collected from a region of interest of the unknown sample where the region of interest is defined by a plurality of x,y spatial coordinates. The test Raman image includes a plurality of test Raman spectra, where each test Raman spectrum has an associated x,y spatial coordinate of the associated region of interest. A mean test Raman spectrum is determined for the unknown sample by averaging the plurality of test Raman spectra. A test Raman difference image is determined by subtracting the mean test Raman spectrum from each of the plurality of test Raman spectra associated with each x,y spatial coordinate and normalizing the subtracted Raman spectra. A diagnosis is provided as to whether the unknown sample has a first disease state or a second disease state by comparing the test Raman difference image to at least one member of the reference Raman database using a chemometric technique.

The present disclosure further provides for a system to provide a diagnosis of a disease state of an unknown sample. The system includes: a reference database, an illumination source, a spectroscopic device, a machine readable program code and a processor. The reference database contains a plurality of reference Raman data sets, each reference Raman data set being associated with a known sample and associated with one or more of: a known disease state and a known clinical outcome and a plurality of reference Raman difference data sets. The illumination source is configured to illuminate an unknown sample with substantially monochromatic light to thereby generate scattered photons. The spectroscopic device is configured to collect a test Raman data set based on the scattered photons. The processor is operatively coupled to the illumination source and the spectroscopic device, and configured to execute the machine readable program code so as to perform a series of steps. In one such embodiment, the spectroscopic device includes an imaging spectrometer. In another such embodiment, the spectroscopic device includes a dispersive spectrometer and a fiber array spectral translator.

The present disclosure further provides for a machine readable program code which causes a processor to perform a series of steps when executed. The steps include: configure an illumination source to illuminate a unknown sample with substantially monochromatic light to thereby generate scattered photons; configure a spectroscopic device to collect a test Raman data set based on said scattered photons; generate a reference Raman difference data set by determining a difference between a first reference Raman dataset and a second reference Raman data set: compare said test Raman data set to a plurality of reference Raman difference data sets using a chemometric technique; and based on said comparing, provide a diagnosis of whether said unknown sample has a first disease state or a second disease state.

BRIEF DESCRIPTION OF THE DRAWINGS

The accompanying drawings, which are included to provide further understanding of the disclosure and are incorporated in and constitute a part of this specification, illustrate embodiments of the disclosure and, together with the description, serve to explain the principles of the disclosure.

In the drawings:

FIG. 5 illustrates a Raman spectrum associated with an x,y coordinate of a region of interest of a sample;

FIG. 6 illustrates the outcome of applying spectra mixture resolution to a reference Raman difference data set to a test Raman data set associated with an unknown sample;

FIG. 12 illustrates to Raman dispersive spectra obtained from several regions of interest shown in FIG. 10;

FIG. 15 illustrates concentration images obtained by applying spectra mixture resolution to a Raman image using a spectrum for a Gleason 7 sample, a spectrum for a Gleason 9 sample and a difference spectrum;

DETAILED DESCRIPTION OF THE DISCLOSURE

Reference will now be made in detail to the preferred embodiments of the present disclosure, examples of which are illustrated in the accompanying drawings. Wherever possible, the same reference numbers will be used throughout the drawings to refer to the same or like parts.

Raman spectroscopy has utility in differentiating normal vs. malignant tissue and differentiating normal vs. benign tissue. In the case of breast cancer, the Raman spectra of malignant and benign tissues show an increase in protein content and a decrease in lipid content versus normal breast tissue. In the case of prostate cancer, we have shown that Raman spectroscopy can discern the clinical outcome of prostate tissue as described in U.S. patent application Ser. No. 12/070,010 which is incorporated herein by reference in its entirety. These results demonstrate that cancer disease states have a molecular basis for their origin. The molecular basis for other disease states can also be detected by Raman spectroscopy. Identification and awareness of such biological factors may provide further insight into the progression of the cancer and other diseases and possible options to contain it before it spreads further. As described herein, differences in Raman spectra for samples having different disease states and/or clinical outcome maybe captured as a difference spectrum which may be used to identify biological factors which contribute to development disease states and/or clinical outcome.

Figure 1:
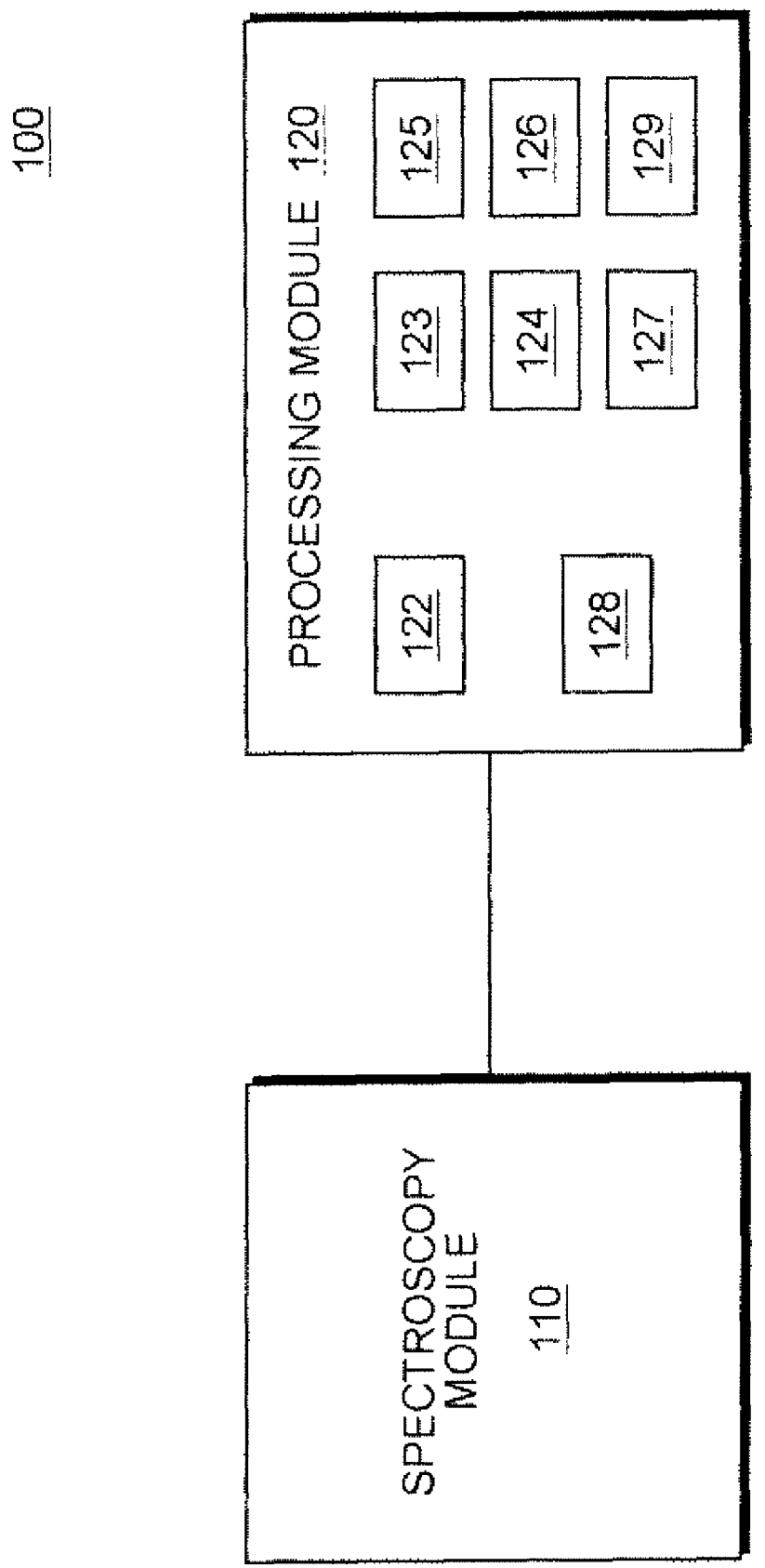
FIG. 1 schematically represents an exemplary system of the present disclosure.

FIG. 1 illustrates an exemplary system 100 according to one embodiment of the present disclosure. System 100 includes a spectroscopy module 110 in communication with a processing module 120. Processing module 120 may include a processor 122, databases 123, 124, 125 and 126, and machine readable program code 128. The machine readable program code 128 may contain executable program instructions, and the processor 122 may be configured to execute the machine readable program code 128 so as to perform the methods of the present disclosure. In one embodiment, the program code 128 may contain the ChemImage Xpert™ software marketed by ChemImage Corporation of Pittsburgh, Pa. The Xpert™ software may be used to process spectroscopic data and information received from the spectroscopy module 110 to obtain various spectral plots and images, and to also carry out various multivariate image analysis methods discussed later herein below.

Figure 2A:
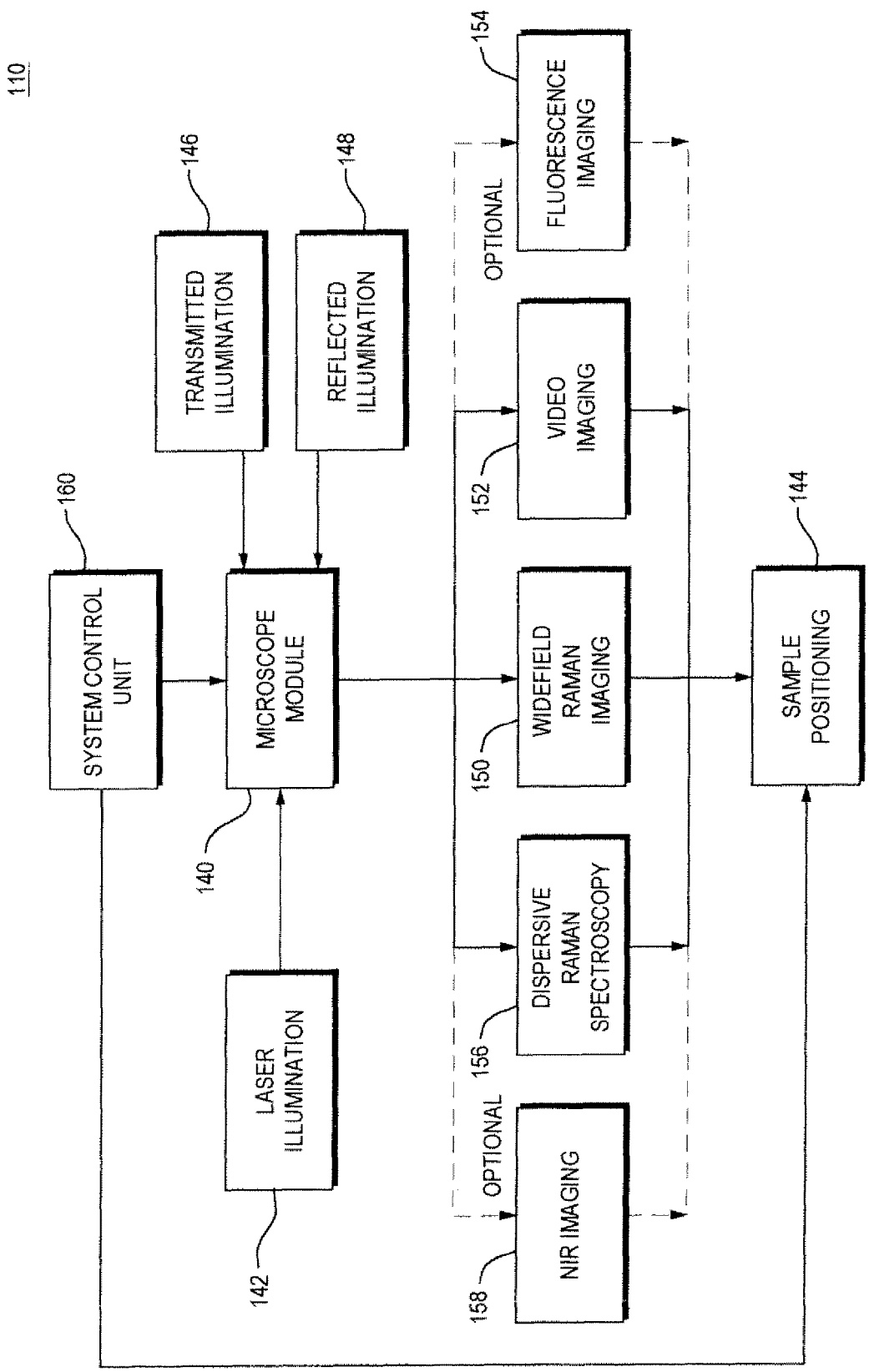
FIGS. 2A and 2B schematically represent an exemplary spectroscopy module of the present disclosure.

FIG. 2A illustrates an exemplary schematic layout of the spectroscopy module 110 shown in FIG. 1. The layout in FIG. 2A may relate to the Falcon II™ Raman chemical imaging system marketed by ChemImage Corporation of Pittsburgh, Pa. In one embodiment, the spectroscopy module 110 may include a microscope module 140 containing optics for microscope applications. An illumination source 142 (e.g., a laser illumination source) may provide illuminating photons to a sample (not shown) handled by a sample positioning unit 144 via the microscope module 140. In one embodiment, photons transmitted, reflected, emitted, or scattered from the illuminated sample (not shown) may pass through the microscope module (as illustrated by exemplary blocks 146, 148 in FIG. 2A) before being directed to one or more of spectroscopy or imaging optics in the spectroscopy module 110. In the embodiment of FIG. 2A, dispersive Raman spectroscopy 156, widefield Raman imaging 150, and brightfield video imaging 152 are illustrated as "standard" operational modes of the spectroscopy module 110. Two optional imaging modes—fluorescence imaging 154 and NIR (Near Infrared) imaging 158—may also be provided if desired. The spectroscopy module 110 may also include a control unit 160 to control operational aspects (e.g., focusing, sample placement, laser beam transmission, etc.) of various system components including, for example, the microscope module 140 and the sample positioning unit 144 as illustrated in FIG. 2A. In one embodiment, operation of various components (including the control unit 160) in the spectroscopy module 110 may be fully automated or partially automated, under user control.

It is noted here that in the discussion herein the terms "illumination," "illuminating," "irradiation," and "excitation" are used interchangeably as can be evident from the context. For example, the terms "illumination source," "light source," and "excitation source" are used interchangeably. Similarly, the terms "illuminating photons" and "excitation photons" are also used interchangeably. Furthermore, although the discussion herein below focuses more on Raman spectroscopy and Raman molecular imaging, various methodologies discussed herein may be adapted to be used in conjunction with other types of spectroscopy applications as can be evident to one skilled in the art based on the discussion provided herein.

FIG. 2R illustrates exemplary details of the spectroscopy module 110 in FIG. 2A according to one embodiment of the present disclosure. Spectroscopy module 110 may operate in several experimental modes of operation including bright field reflectance and transmission imaging, polarized light imaging, differential interference contrast (DIC) imaging, UV induced autofluorescence imaging, NIR imaging, wide field illumination whole field Raman spectroscopy, wide field spectral fluorescence imaging, and wide field spectral Raman imaging. Module 10 may include collection optics 203, light sources 202 and 204, and a plurality of spectral information processing devices including, for example: a tunable fluorescence filter 222, a tunable Raman filter 218, a dispersive spectrometer 214, a plurality of detectors including a fluorescence detector 224, and Raman detectors 216 and 220, a fiber array spectral translator ("FAST") device 212, filters 208 and 210, and a polarized beam splitter (PBS) 219. In one embodiment, the processor 122 (FIG. 1) may be operatively coupled to light sources 202 and 204, and the plurality of spectral information processing devices 214, 218 and 222. In another embodiment, the processor 122 (FIG. 1), when suitably programmed, can configure various functional parts of the spectroscopy module in FIG. 1 and may also control their operation at run time. The processor, when suitably programmed, may also facilitate various remote data transfer and analysis operations discussed in conjunction with FIG. 3. Module 110 may optionally include a video camera 205 for video imaging applications. Although not shown in FIG. 2B, spectroscopy module 110 may include many additional optical and electrical components to carry out various spectroscopy and imaging applications supported thereby.

A sample 201 may be placed at a focusing location (e.g., by using the sample positioning unit 144 in FIG. 2A) to receive illuminating photons and to also provide reflected, emitted, scattered, or transmitted photons from the sample 201 to the collection optics 203. Sample 201 may include a variety of biological samples. In one embodiment, the sample 201 includes at least one cell or a tissue containing a plurality of cells. The sample may contain normal (non-diseased or benign) cells, diseased cells (e.g., cancerous tissues of various grades with or without a progressive cancer state or malignant cells with or without a progressive cancer state) or a combination of normal and diseased cells. In one embodiment, the cell/tissue is a mammalian cell/tissue. Some examples of biological samples may include prostate cells, kidney cells, lung cells, colon cells, bone marrow cells, brain cells, red blood cells, and cardiac muscle cells. In one such embodiment, the biological sample may include prostate cells. In one such embodiment, the biological sample may include one or more of the following: Cells from in a tissue sample of Gleason 3 prostate; Gleason 4 prostate; Gleason 5 prostate; Gleason 6 prostate; Gleason 7 prostate; Gleason 8 prostate; and Gleason 9 prostate. In another embodiment, the sample 201 may include cells of plants, non-mammalian animals, fungi, protists, and manera. In yet another embodiment, the sample 201 may include an unknown sample (e.g., a biological sample under test to determine its metabolic state or its disease status or to determine whether it is cancerous state would progress to the next level). The terms "unknown sample" or "test sample," "Target sample" are used interchangeably herein to refer to a biological sample under investigation, wherein such interchange use may be without reference to such biological sample's disease state or clinical outcome.

At some level, a biological sample's disease state may be characterized by its grade or score. In one embodiment, a disease state corresponds one or more of the following: to a Gleason score 3; corresponds to a Gleason score 4; corresponds to a Gleason score 5; corresponds to a Gleason score 6; corresponds to a Gleason score 7; corresponds to a Gleason score 8; and corresponds to a Gleason score 9.

A biological sample's clinical outcome may be characterized by progressive disease or non-progressive disease. In one embodiment, a progressive cancer state is a cancer that will go on to become aggressive and acquire subsequent treatment by more aggressive means in order for the patient to survive. An example of progressive cancer is a Gleason score 7 cancer found in a prostate which has been surgically removed, where the patient, subsequent to the removal of the prostate, develops metastatic cancer. In this example the cancer progressed even after the removal of the source organ. Progressive cancers can be detected and identified in other organs and different types of cancer.

In one embodiment, a non-progressive cancer is a cancer that does not progress to more advanced disease, requiring aggressive treatment. Many prostate cancers are non-progressive by this definition because though they are cancer by standard histopathological definition, they do not impact the life of the patient in a way that requires significant treatment. In many cases such cancers are observed and treated only if they show evidence of becoming progressive. Again, this is not a state particular to prostate cancer. Cancer cells are present in tissues of many healthy people. Because these do not ever transition to a state where they become progressive in terms of growth, danger to the patient, or inconvenience to the patient they would be considered non-progressive as the term is used herein.

The designation of progressive vs. non progressive can also be extended to other disease or metabolic states. As an example, diabetes can be clinically described as "stable", "well managed" by a clinician and would fall into the non-progressive class. In contrast diabetes can be progressing through the common course of the disease with all of the effects on kidneys, skin, nerves, heart and other organs which are part of the disease. As a second example multiple sclerosis is a disease which exists in many people is a stable, non-progressive state. In some people the disease rapidly progresses through historically observed pattern of physical characteristics with clinical manifestations.

The cells can be isolated cells, such as individual blood cells or cells of a solid tissue that have been separated from other cells of the tissue (e.g., by degradation of the intracellular matrix). The cells can also be cells present in a mass, such as a bacterial colony grown on a semi-solid medium or an intact or physically disrupted tissue. The cells can also be cells present within the structure of a tissue as seen on a thin section used in microscopy. By way of example, blood drawn from a human can be smeared on the surface of a suitable Raman scattering substrate (e.g., an aluminum-coated glass slide) and individual cells in the sample can be separately imaged by light microscopy and Raman scattering analysis using the spectroscopy module 110 of FIG. 2B. Similarly a slice of a solid tissue (e.g., a piece of fresh tissue or a paraffin-embedded thin section of a tissue) can be imaged on a suitable surface.

The cells can be cells obtained from a subject (e.g., cells obtained from a human blood or urine sample, semen sample, tissue biopsy, or surgical procedure). Cells can also be studied where they naturally occur, such as cells in an accessible location (e.g., a location on or within a human body), cells in a remote location using a suitable probe, or by revealing cells (e.g., surgically) that are not normally accessible.

Referring again to FIG. 2B, light source 202 may be used to irradiate the sample 201 with substantially monochromatic light. Light source 202 can include any conventional photon source, including, for example, a laser, an LED (light emitting diode), or other IR (infrared) or near IR (NIR) devices. The substantially monochromatic radiation reaching sample 201 illuminates the sample 201, and may produce photons scattered from different locations on or within the illuminated sample 201. A portion of the Raman scattered photons from the sample 201 may be collected by the collection optics 203 and directed to dispersive spectrometer 214 or Raman tunable filter 218 for further processing discussed later herein below. In one embodiment, light source 202 includes a laser light source producing light at 532.1 nm. The laser excitation signal is focused on the sample 201 through combined operation of reflecting mirrors M1, M2, M3, the filter 208, and the collection optics 203 as illustrated by an exemplary optical path in the embodiment of FIG. 2B. The filter 208 may be tilted at a specific angle from the vertical (e.g., at 6.5°) to reflect laser illumination onto the mirror M3, but not to reflect Raman-scattered photons received from the sample 201. The other filter 210 may not be tilted (i.e., it remains at 0° from the vertical). Filters 208 and 210 may function as laser line rejection filters to reject light at the wavelength of laser light source 202.

Figure 2B:
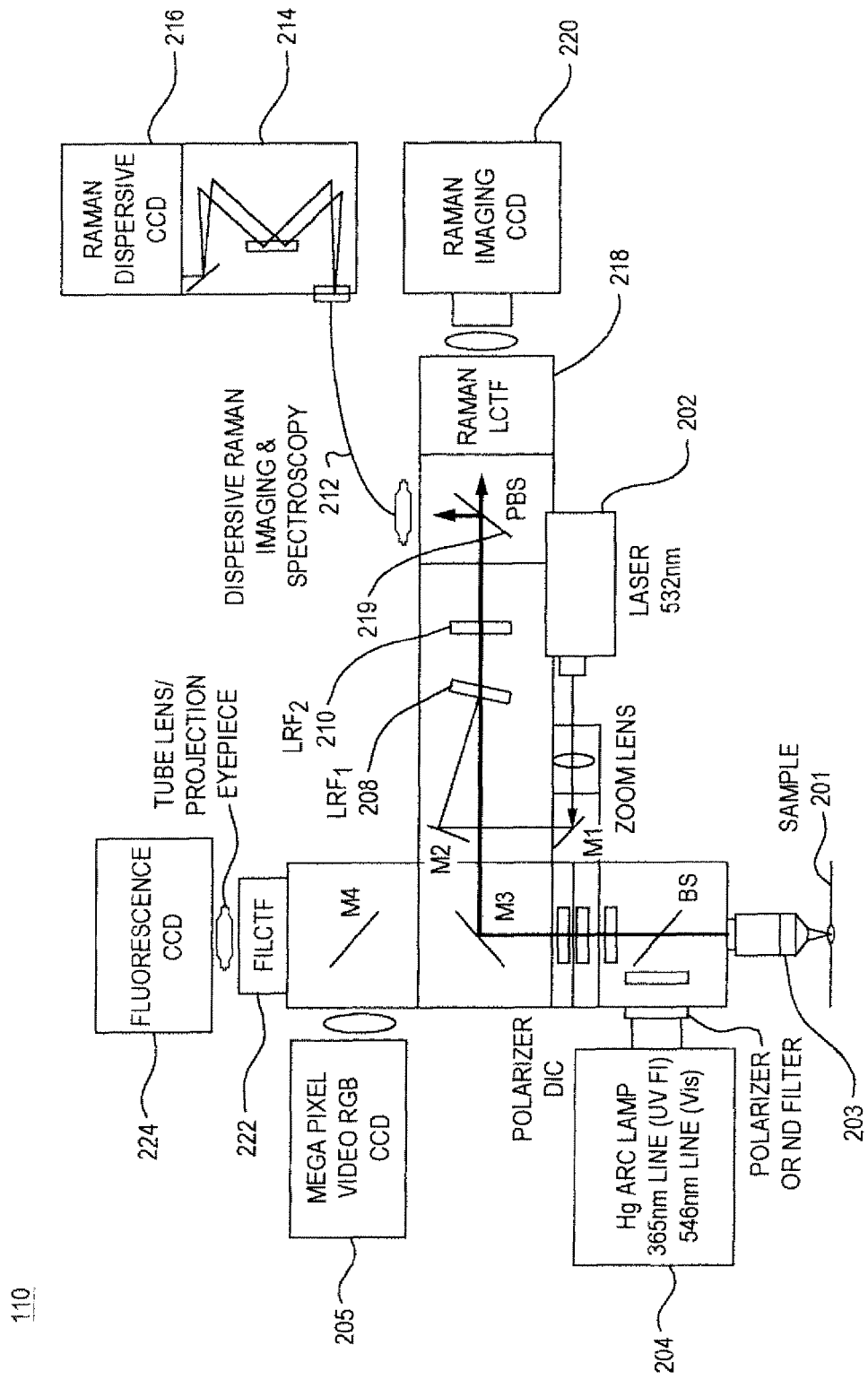

In the spectroscopy module 110 in the embodiment of FIG. 2B, the second light source 204 may be used to irradiate the sample 201 with ultraviolet light or visible light. In one embodiment, the light source 204 includes a mercury arc (Hg arc) lamp that produces ultraviolet radiation (UV) having wavelength at 365 nm for fluorescence spectroscopy applications. In yet another embodiment, the light source 204 may produce visible light at 546 nm for visible light imaging applications. A polarizer or neutral density (ND) filter with or without a beam splitter (BS) may be provided in front of the light source 204 to obtain desired illumination light intensity and polarization.

In the embodiment of FIG. 2B, the dispersive spectrometer 214 and the Raman tunable filter 218 function to produce Raman data sets of sample 201. A Raman data set corresponds to one or more of the following: a plurality of Raman spectra of the sample; and a plurality of spatially accurate wavelength resolved Raman images of the sample. The Raman spectra and/or Raman images may be collected over a range of Raman shift values. In one embodiment, a Raman spectrum and/or Raman image may be collected at a plurality of Raman shift values ranging from 500 cm$^{-1}$ to 3200 cm$^{-1}$. In another embodiment, a Raman spectrum and/or Raman image may be collected at a plurality of Raman shift values ranging from 400 cm$^{-1}$ to 1850 cm$^{-1}$. In one embodiment, a plurality of Raman spectra is generated by dispersive spectral measurements of individual cells. In this embodiment, the illumination of the individual cell may cover the entire area of the cell so the dispersive Raman spectrum is an integrated measure of spectral response from all the locations within the cell.

In yet another embodiment, a Raman data set corresponds to a Raman image associated with a region of interest of the sample 201. In one such embodiment, the region of interest contains at least one of the following: an epithelium area, a stroma area, epithelial-stromal junction (ESJ) area and/or nuclei area. A region of interest is defined by a plurality of x,y spatial coordinates or pixels. The terms "x,y spatial coordinate" and "pixel" are used interchangeably. A plurality of Raman spectra may be obtained from the one or more of regions of interest of the sample 201. In standard operation, the Raman spectrum, generated by selecting a region of interest in a Raman image, is the average spectrum of all the spectra at each pixel within the region of interest. The standard deviation between of all the spectra in the region of interest may be displayed along with the average Raman spectrum of the region of interest. Alternatively, all of the spectra associated with the x,y coordinates (e.g., pixels) within a region can be considered as a plurality of spectra, without the step of reducing them to a mean and standard deviation. The Raman spectra may be collected over a range of Raman shift values. In one embodiment, a Raman spectrum may be collected at a plurality of Raman shift values ranging from 500 cm$^{-1}$ to 3200 cm$^{-1}$. In another embodiment, a Raman spectrum may be collected at a plurality of Raman shift values ranging from 400 cm$^{-1}$ to 1850 cm$^{-1}$.

With further reference to FIG. 2B, the fluorescence tunable filter 222 may function to produce fluorescence data sets of the photons emitted from the sample 201 under suitable illumination (e.g., UV illumination). In one embodiment, the fluorescence data set includes a plurality of fluorescence spectra of sample 201 and/or a plurality of spatially accurate wavelength resolved fluorescence images of sample 201. A fluorescence spectrum of sample 210 may contain a fluorescence emission signature of the sample 201. In one embodiment, the emission signature may be indicative of a fluorescent probe (e.g., fluorescein isothiocyanate) within the sample 201. The fluorescence data sets may be detected by fluorescence CCD detector 224. A portion of the fluorescence emitted photons or visible light reflected photons from the sample 201 may be directed to the video imaging camera 205 via a mirror M4 and appropriate optical signal focusing mechanism.

In one embodiment, a microscope objective (including the collection optics 203) may be automatically or manually zoomed in or out to obtain proper focusing of the sample.

The entrance slit (not shown) of the spectrometer 214 may be optically coupled to the output end of the fiber array spectral translator device 212 to disperse the Raman scattered photons received from the FAST device 212 and to generate a plurality of spatially resolved Raman spectra from the wavelength-dispersed photons. The FAST device 212 may receive Raman scattered photons from the beam splitter 219, which may split and appropriately polarize the Raman scattered photons received from the sample 201 and transmit corresponding portions to the input end of the FAST device 212 and the input end of the Raman tunable filter 218.

Referring again to FIG. 2B, the tunable fluorescence filter 222 and the tunable Raman filter 218 may be used to individually tune specific photon wavelengths of interest and to thereby generate a plurality of spatially accurate wavelength resolved spectroscopic fluorescence images and Raman images, respectively, in conjunction with corresponding detectors 224 and 220. In one embodiment, each of the fluorescence filter 222 and the Raman filter 218 includes a two-dimensional tunable filter, such as, for example, an electro-optical tunable filter, a liquid crystal tunable filter (LCTF), or an acousto-optical tunable filter (AOTF). A tunable filter may be a band-pass or narrow band filter that can sequentially pass or "tune" fluorescence emitted photons or Raman scattered photons into a plurality of predetermined wavelength bands. The plurality of predetermined wavelength bands may include specific wavelengths or ranges of wavelengths. In one embodiment, the predetermined wavelength bands may include wavelengths characteristic of the sample undergoing analysis. The % wavelengths that can be passed through the fluorescence filter 222 and Raman filter 218 may range from 200 nm (ultraviolet) to 2000 nm (i.e., the far infrared). The choice of a tunable filter depends on the desired optical region and/or the nature of the sample being analyzed. Additional examples of a two-dimensional tunable filter may include a Fabry Perot angle tuned filter, a Lyot filter, an Evans split element liquid crystal tunable filter, a Sole liquid crystal tunable filter, a spectral diversity filter, a photonic crystal filter, a fixed wavelength Fabry Perot tunable filter, an airtuned Fabry Perot tunable filter, a mechanically-tuned Fabry Perot tunable filter, and a liquid crystal Fabry Perot tunable filter. As noted before, the tunable filers 218, 222 may be selected to operate in one or more of the following spectral ranges: the ultraviolet (UV), visible, and near infrared.

In one embodiment, a multi-conjugate filter (MCF) may be used instead of a simple LCTF (e.g., the LCTF 218 or 222) to provide more precise wavelength tuning of photons received from the sample 201. Some exemplary multi-conjugate filters are discussed, for example, in U.S. Pat. No. 6,992,809, titled "Multi-Conjugate Liquid Crystal Tunable Filter;" and in the United States Published Patent Application Number US2007/0070260A1, titled "Liquid Crystal Filter with Tunable Rejection Band," the disclosures of both of these publications are incorporated herein by reference in their entireties.

In the embodiment of FIG. 2B, the fluorescence spectral data sets (output from the tunable filter 222) may be detected by the detector 224, and the Raman spectral data sets (output from the spectrometer 214 and the tunable filter 218) may be detected by detectors 216 and 220. The detectors 216, 220, and 224 may detect received photons in a spatially accurate manner. Detectors 216, 220 and 224 may include an optical signal (or photon) collection device such as, for example, an image focal plane array (FPA) detector, a charge coupled device (CCD) detector, or a CMOS (Complementary Metal Oxide Semiconductor) array sensor. Detectors 216, 220 and 224 may measure the intensity of scattered, transmitted or reflected light incident upon their sensing surfaces (not shown) at multiple discrete locations or pixels, and transfer the spectral information received to the processor module 120 for storage and analysis. The optical region employed to characterize the sample of interest governs the choice of two-dimensional array detector. For example, a two-dimensional array of silicon charge-coupled device (CCD) detection elements can be employed with visible wavelength emitted or reflected photons, or with Raman scatter photons, while gallium arsenide (GaAs) and gallium indium arsenide (GaInAs) FPA detectors can be employed for image analyses at near infrared wavelengths. The choice of such devices may also depend on the type of sample being analyzed.

In one embodiment, a display unit (not shown) may be provided to display spectral data collected by various detectors 216, 220, 224 in a predefined or user-selected format. The display unit may be a computer display screen, a display monitor, an LCD (liquid crystal display) screen, or any other type of electronic display device.

Referring again to FIG. 1, the databases 123-127 and 129 may store various reference spectral data sets including, for example, a reference Raman data set, a reference fluorescence data set, a reference NIR data set, etc. The reference data sets may be collected from different samples and may be used to detect or identify the sample 201 from comparison of its spectral data set with the reference data sets. In one embodiment, during operation, the Raman data sets and fluorescence data sets of the sample 201 also may be stored in one or more of the databases (e.g., database 123) of the processing module 120.

For example, in one embodiment, database 123 may be used to store a plurality of reference Raman data sets from reference cells having a known disease state and/or known clinical outcome. In one such embodiment, the reference Raman data sets may correspond to a plurality of reference Raman spectra. In another such embodiment, the reference Raman data sets may correspond to a plurality of reference spatially accurate wavelength resolved Raman images.

In yet another embodiment, the database 124 may store a first plurality of reference Raman data sets from different types of reference diseased cells. In one embodiment, the first reference set of Raman data sets includes a plurality of first reference Raman spectra each spectrum associated with a first known sample having a first known disease state and/or first known clinical outcome. In one embodiment, the first reference Raman spectrum may correspond to a dispersive Raman spectrum. In another embodiment, the first reference set of Raman data sets may include a plurality of first reference spatially accurate wavelength resolved Raman images obtained from corresponding reference diseased cells.

In yet another embodiment, the database 125 may store a second plurality of reference Raman data sets from different types of reference diseased cells, each spectrum associated with a second known sample having a second known disease state and/or second known clinical outcome. In one embodiment, the second reference set of Raman data sets includes a plurality of second reference Raman spectra. In one embodiment, the second reference Raman spectrum may correspond to a dispersive Raman spectrum. In another embodiment, the second reference set of Raman data sets may include a plurality of second reference spatially accurate wavelength resolved Raman images obtained from corresponding reference diseased cells.

In yet another embodiment, the database 126 may store a plurality of reference Raman difference data sets generated from reference Raman data sets each reference Raman data set associated a different type of reference diseased cell. In one embodiment, the reference Raman difference data sets includes a plurality of reference Raman difference spectra. The generation of a reference Raman difference data sets is discussed below herein.

Similarly, database 127 may store a plurality of reference fluorescence spectra and/or a plurality of reference spatially accurate wavelength resolved fluorescence spectroscopic images obtained from reference biological samples (e.g., cancerous human tissues). One or more of the reference biological samples may include fluorescence probe molecules (e.g., fluorescein isothiocyanate). In one embodiment, a single database may be used to store all types of spectra.

The reference Raman data sets may be associated with a reference Raman image and/or a corresponding reference non-Raman image. In one such embodiment, the reference non-Raman image may include at least one of: a brightfield image; a polarized light image; and a UV-induced autofluorescence image.

Figure 3:
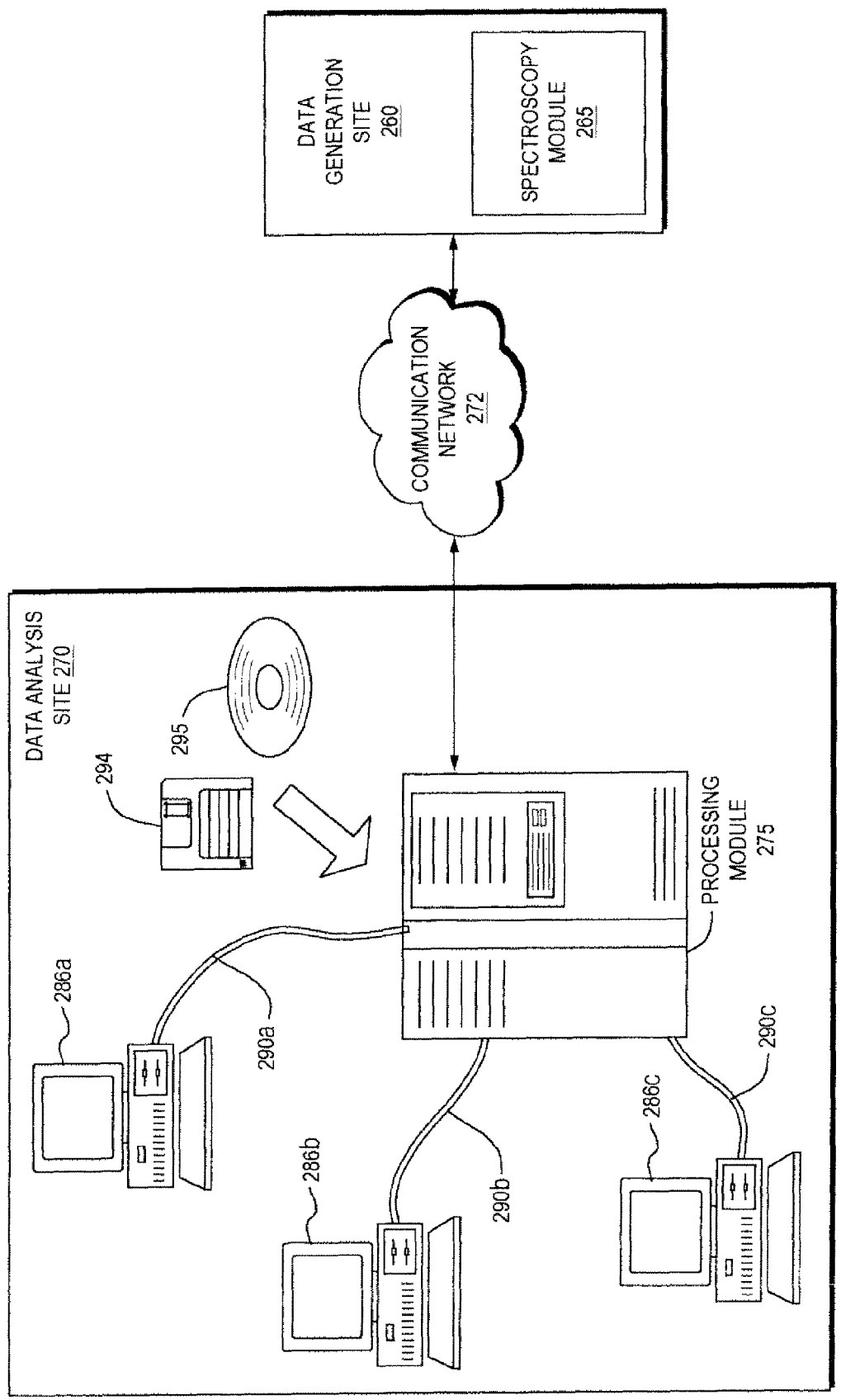
FIG. 3 schematically represents an exemplary system of the present disclosure.

FIG. 3 depicts an exemplary setup to remotely perform spectroscopic analysis of test samples according to one embodiment of the present disclosure. Spectroscopic data from a test sample may be collected at a data generation site 260 using a spectroscopy module 265. In one embodiment, the spectroscopy module may be functionally similar to the spectroscopy module 110 discussed hereinbefore with reference to FIGS. 2A-2B. The spectroscopic data collected at the data generation site 260 may be transferred to a data analysis site 270 via a communication network 272. In one embodiment, the communication network 272 may be any data communication network such as an Ethernet LAN (local area network) connecting all the data processing and computing units within a facility, e.g., a university research laboratory, or a corporate research center. In that case, the data generation site 260 and the data analysis site 270 may be physically located within the same facility, e.g., a university research laboratory or a corporate research center. In alternative embodiments, the communication network 272 may include, independently or in combination, any of the present or future wireline or wireless data communication networks such as, for example, the Internet, the PSTN (public switched telephone network), a cellular telephone network, a WAN (wide area network), a satellite-based communication link, a MAN (metropolitan area network), etc. In some embodiments, the data generation site 260 and the data analysis site 270 that are linked by the communication network 272 may be owned or operated by different entities.

The data analysis site 270 may include a processing module 275 to process the spectroscopic data received from the data generation site 260. In one embodiment, the processing module 275 may be similar to the processing module 120 and may also include a number of different databases (not shown) storing different reference spectroscopic data sets (e.g., a first plurality of reference Raman data sets for non-progressive cancer tissues, a second plurality of reference Raman data sets for progressive cancer tissues, a third plurality of reference Raman data sets for normal or non-diseased tissues, etc.). The processing module 275 may include a processor (similar to the processor 122 of the processing module 120 in FIG. 1) that is configured to execute program code or software to perform various spectral data processing tasks according to the teachings of the present disclosure. The machine-readable program code containing executable program instructions may be initially stored on a portable data storage medium, e.g., a floppy diskette 294, a compact disc or a DVD 295, a data cartridge tape (not shown), or any other suitable digital data storage medium. The processing module 275 may include appropriate disk drives to receive the portable data storage medium and may be configured to read the program code stored thereon, thereby facilitating execution of the program code by its processor. The program code, upon execution by the processor of the processing module 275, may cause the processor to perform a variety of data processing and display tasks including, for example, initiate transfer of spectral data set from the data generation site 260 to the data analysis site 270 via the communication network 272, compare the received spectral data set to various reference data sets stored in the databases of the processing module 275, classify or identify the test sample based on the comparison (e.g., whether the test sample has a progressive cancer or non-progressive cancer state), transfer the classification or identification results to the data generation site 260 via the communication network 272, etc.

In one embodiment, the data analysis site 270 may include one or more computer terminals 286A-286C communicatively connected to the processing module 275 via corresponding data communication links 290A-290C, which can be serial, parallel, or wireless communication links, or a suitable combination thereof. Thus, users may utilize functionalities of the processing module 275 via their computer terminals 286A-286C, which may also be used to display spectroscopic data received from the data generation site 260 and the results of the spectroscopic data processing by the processing module 275, among other applications. It is evident that in a practical application, there may be many more computer terminals 286 than just three terminals shown in FIG. 3.

The computer terminals 286A-286C may be, e.g., a personal computer (PC), a graphics workstation, a multiprocessor computer system, a distributed network of computers, or a computer chip embedded as part of a machine or mechanism. Similarly, the data generation site 260 may include one or more of such computers (not shown) for viewing the results of the spectroscopic analysis received from the data analysis site 270. Each computer terminal, whether at the data generation site 260 or at the data analysis site 270, may include requisite data storage capability in the form of one or more volatile and non-volatile memory modules. The memory modules may include RAM (random access memory), ROM (read only memory) and HDD (hard disk drive) storage.

It is noted that the arrangement depicted in FIG. 3 may be used to provide a commercial, network-based spectroscopic data processing service that may perform customer-requested processing of spectroscopic data in real time or near real time. For example, the processing module 275 at the data analysis site 270 may be configured to identify a test sample from the spectroscopic data remotely submitted to it over the communication network 272 (e.g., the Internet) from the spectroscopy module 265 automatically or through an operator at the data generation site 260. The client site (data generation site) 260 may be, for example, a government laboratory or a medical facility or pathological laboratory. The results of spectroscopic data analysis may be transmitted back to the client site 260 for review and further analysis. In one embodiment, the whole data submission, analysis, and reporting process can be automated.

It is further noted that the owner or operator of the data analysis site 270 may commercially offer a network-based spectroscopic data content analysis service, as illustrated by the arrangement in FIG. 3, to various individuals, corporations, governmental entities, laboratories, or other facilities on a fixed-fee basis, on a per-operation basis or on any other payment plan mutually convenient to the service provider and the service recipient.

Figure 4:
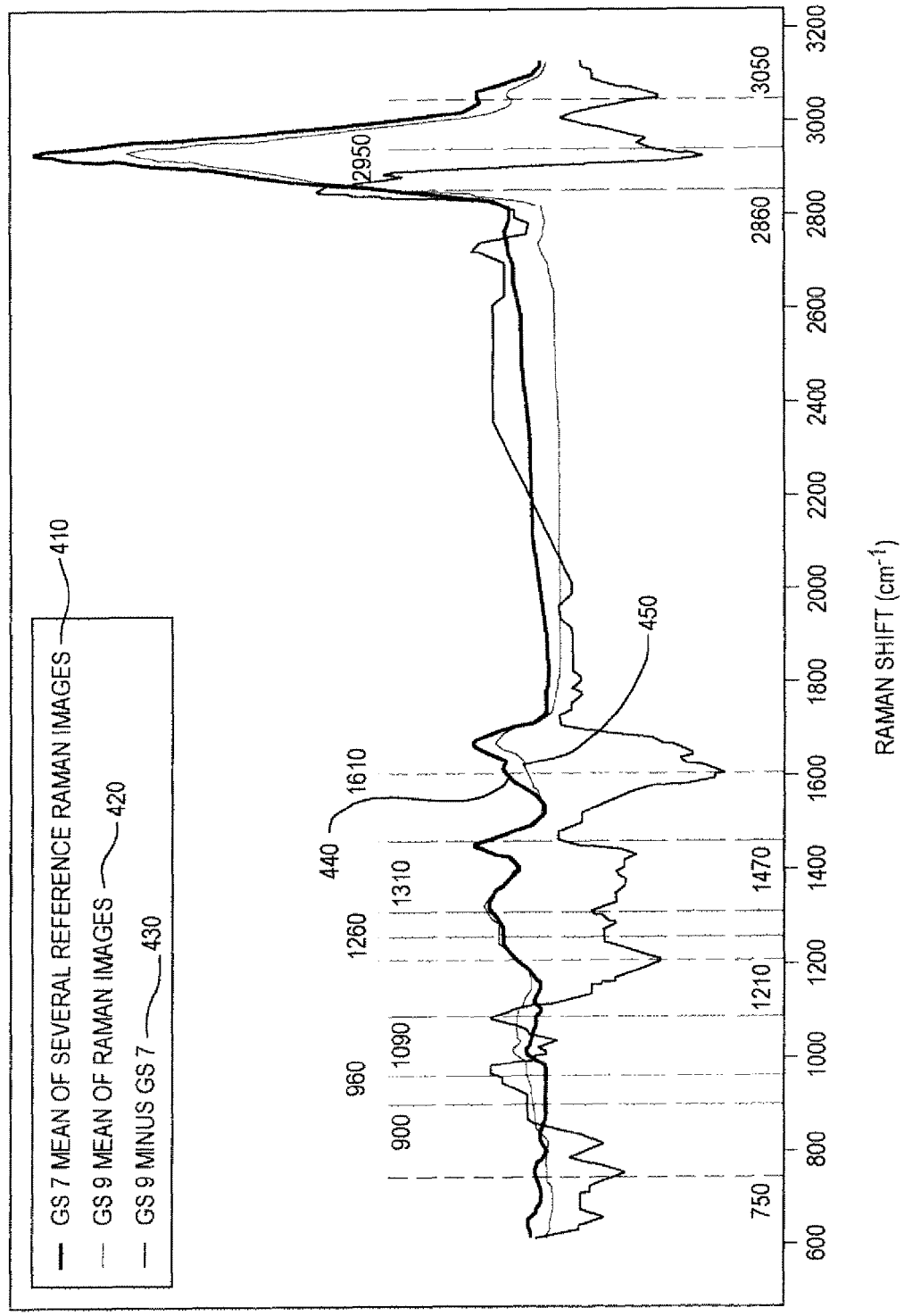
FIG. 4 illustrates the generation of a difference Raman spectrum of one embodiment.

FIG. 4 exemplifies the generation of a reference Raman difference data set 430 from a first reference Raman spectrum 410 and a second reference Raman spectrum 420. Reference Raman spectrum 410 is associated with a first known sample having a first known disease state and/or first known clinical outcome. In FIG. 4, reference Raman spectrum 410 corresponds to a sample having a Gleason 7 score ("GS 7"). Reference Raman spectrum 420 is associated with a second known sample having a second known disease state and/or second known clinical outcome. In FIG. 4, reference Raman spectrum 420 corresponds to a sample having a Gleason 9 score ("GS 9"). The difference spectrum 430 is a plot of differences in corresponding intensity values on the y-axis between the reference spectrum 410 and reference spectrum 420 along a plurality of Raman shift values on the x-axis. To accommodate the difference spectrum along with the individual spectra in FIG. 4, the difference spectrum may be positionally adjusted (e.g., through shifting of axis) to account for positive and negative results obtained by subtracting a value 440 from reference spectrum 410 from a corresponding value 450 of reference spectrum. It is seen from FIG. 4 that at certain Raman shift values (e.g., Raman shift values identified by vertical dotted lines in FIG. 4), the reference Raman difference spectrum exhibits substantial intensity variations and significantly deviates from spectra 410 and 420. This deviation may signify that there may be one or more biological "factors" influencing a GS 9 tissue but absent from a GS 7 tissue. Alternatively, there may be some biological factor(s) present in the GS 7 tissue and absent from the GS 9 tissue. These differences may be used to provide a diagnosis of an unknown sample's disease state and/or clinical outcome.

Processing module 120 may also include a test Raman database 129 associated with an unknown biological sample having an unknown disease state and/or unknown clinical outcome. In one such embodiment, the test Raman data sets may correspond to a plurality of test Raman spectra of the unknown biological sample. In another such embodiment, the test Raman data sets may correspond to a plurality of spatially accurate wavelength resolved Raman images of the unknown biological sample. In another embodiment, each of the test Raman data sets may be associated with a corresponding test non-Raman image. In one such embodiment, the test non-Raman image may include at least one of the following: a brightfield image; a polarized light image; and a UV-induced autofluorescence image.

In still yet another embodiment, the test Raman data set is associated with a region of interest of the unknown sample 500, FIG. 5. The test Raman data set contains a plurality of test Raman spectra. The associated region of interest 505 is defined by a plurality of x and y spatial coordinates, 510, 520. Each x,y spatial coordinate 510, 520 has an associated test Raman spectrum 540 and 550, respectively. In one such embodiment, the region of interest contains at least one of the following: an epithelium area, a stroma area, epithelial-stromal junction (ESJ) area, and/or nuclei area. Regions of interest containing only a specific tissue of interest can be located either manually through the interaction of a user, or automatically in some cases through a process of data processing called masking. In a data masking process the data is evaluated to determine which pixels have data with a specific characteristic. Specific characteristics can include but are not limited to intensity, classification result by some process, and signal to noise ratio as examples. The pixels which have the desired characteristic are included in a "mask image" which has the same number of pixels as the image which is to be masked as a value of 1 at the x,y position of the pixel. All other pixels in the "mask image" have the value zero. In order to select only regions which have specific tissue characteristics, a mask for the desired characteristic (e.g. epithelium) is created, then multiplied by the image.

In one embodiment, a diagnosis of an unknown sample as having a particular disease state may be made by comparing a test Raman data set to a plurality of reference Raman difference data sets using a chemometric technique. In another embodiment, a diagnosis of an unknown sample as having a particular clinical outcome may be made by comparing a test Raman data set to a plurality of reference Raman difference data sets using a chemometric technique. The chemometric technique may include at least one of the following: Principal Component Analysis, Minimum noise fraction, spectral mixture resolution and linear discriminant analysis.

In one embodiment, the chemometric technique may be spectral unmixing. The application of spectral unmixing to determine the identity of components of a mixture is described in U.S. Pat. No. 7,072,770, entitled "Method for Identifying Components of a Mixture via Spectral Analysis, issued on Jul. 4, 2006, which is incorporated herein by reference in it entirety. Spectral unmixing as described in the above referenced patent can be applied as follows: Spectral unmixing requires a library of spectra which include possible components of the test sample. The library can in principle be in the form of a single spectrum for each component, a set of spectra for each component, a single Raman image for each component, a set of Raman images for each component, or any of the above as recorded after a dimension reduction procedure such as Principle Component Analysis. In the methods discussed herein, the library used as the basis for application of spectral unmixing is the reference Raman difference data sets and the reference Raman data sets.

With this as the library, a set of Raman measurements made on a sample of unknown state, described herein as a test Raman data set, is assessed using the methods of U.S. Pat. No. 7,072,770 to determine the most likely groups of components which are present in the sample. In this instance the components are actually disease states of interest and/or clinical outcome. The result is a set of disease state groups and/or clinical outcome groups with a ranking of which are most likely to be represented by the test data set.

Given a set of reference spectra, such as those described above a piece or set of test data can be evaluated by a process called spectral mixture resolution. In this process the test spectrum is approximated with a linear combination of reference spectra with a goal of minimizing the deviation of the approximation from the test spectrum. This process results in a set of relative weights for the reference spectra.

FIG. 6 illustrates exemplary concentration images 610, 620, 630 which result from the spectral mixture resolution analysis of a test Raman image of an unknown sample. A reference Raman data set for a GS 7 sample, a reference Raman data set for a GS 9 sample and a reference Raman difference data set (GS9 minus GS7 spectrum), of FIG. 4, were used in the spectral mixture resolution analysis. Brighter pixels (i.e., closer in color to white) represent a higher concentration of the corresponding component in a frame. Concentration image 610, of the GS 9 component, contains mostly white pixels, indicating that the majority of the Raman signal from the region of interest represents GS 9 prostate cancer. Concentration image 620 illustrates the GS 7 component present in the Raman image. Concentration image 630 illustrates the difference component present in the Raman image. The area 640, highlighted with an arrow, may represent the components associated with the difference spectrum 430.

In one embodiment, the chemometric technique may be Principal Component Analysis. Using Principal Component Analysis results in a set of mathematical vectors defined based on established methods used in multivariate analysis. The vectors form an orthogonal basis, meaning that they are linearly independent vectors and can be used as a classification model as described below. The vectors are determined based on a set of input data by first choosing a vector which describes the most variance within the input data. This first "principal component" or PC is subtracted from each of the members of the input set. The input set after this subtraction is then evaluated in the same fashion (a vector describing the most variance in this set is determined and subtracted) to yield a second vector—the second principal component. The process is iterated until either a chosen number of linearly independent vectors (PCs) are determined, or a chosen amount of the variance within the input data is accounted for.

Figure 24:
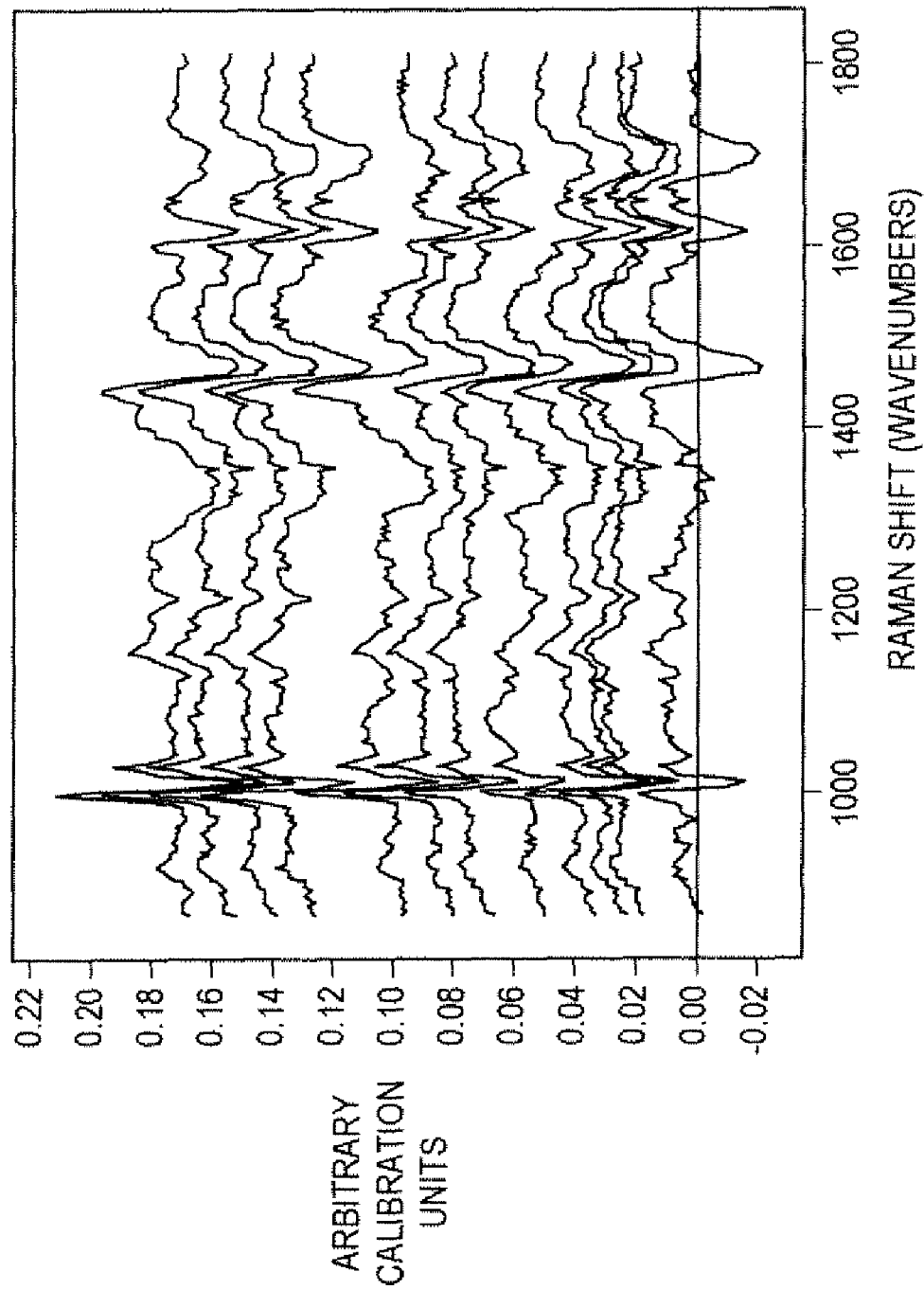
FIG. 24 illustrates twelve (12) difference Raman spectra obtained from the twelve (12) Raman spectra of FIG. 23.
Figure 25:
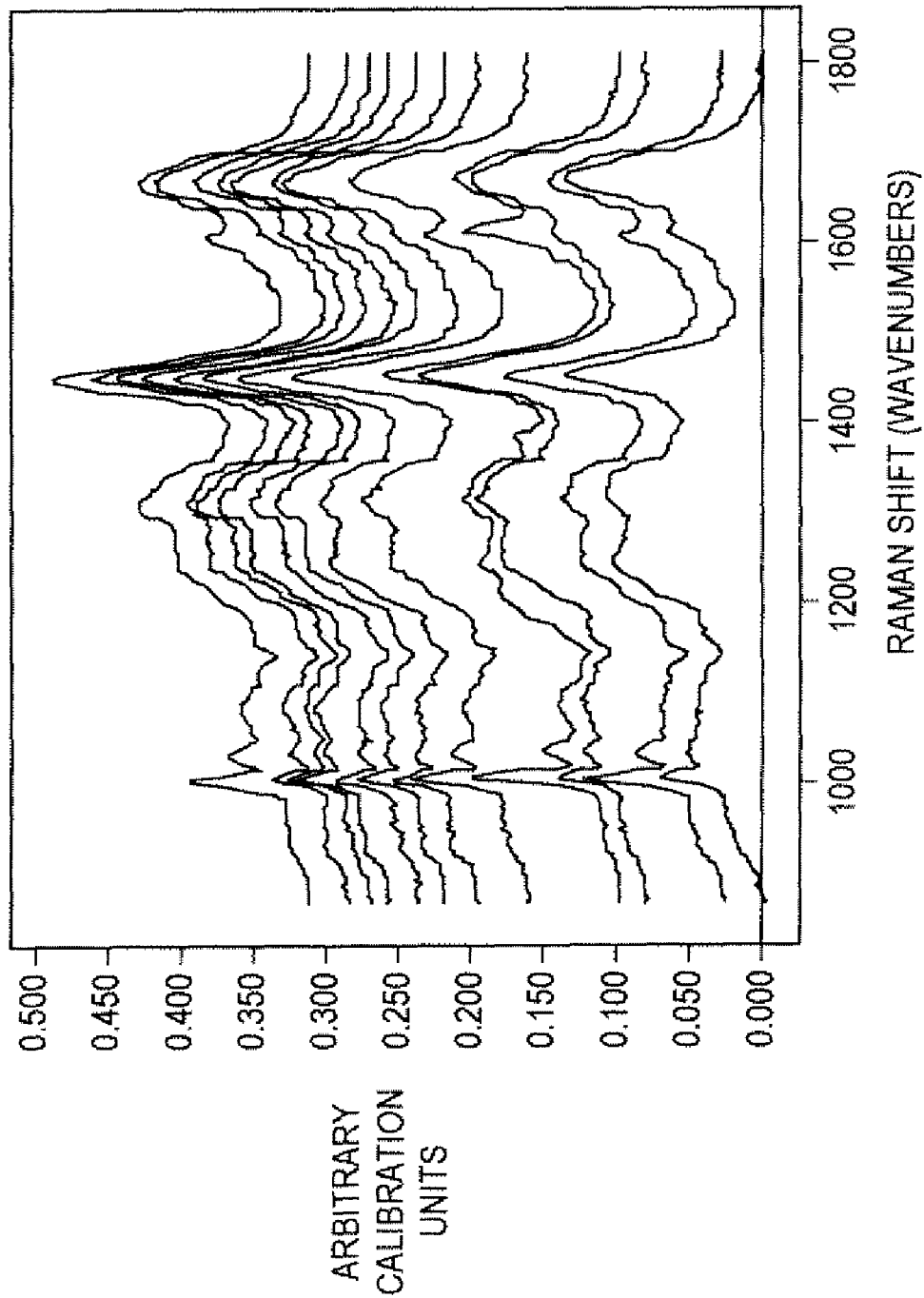
FIG. 25 illustrates twelve (12) Raman spectra for a series of tissue samples having a Gleason 7 score and progressive clinical outcome.
Figure 26:
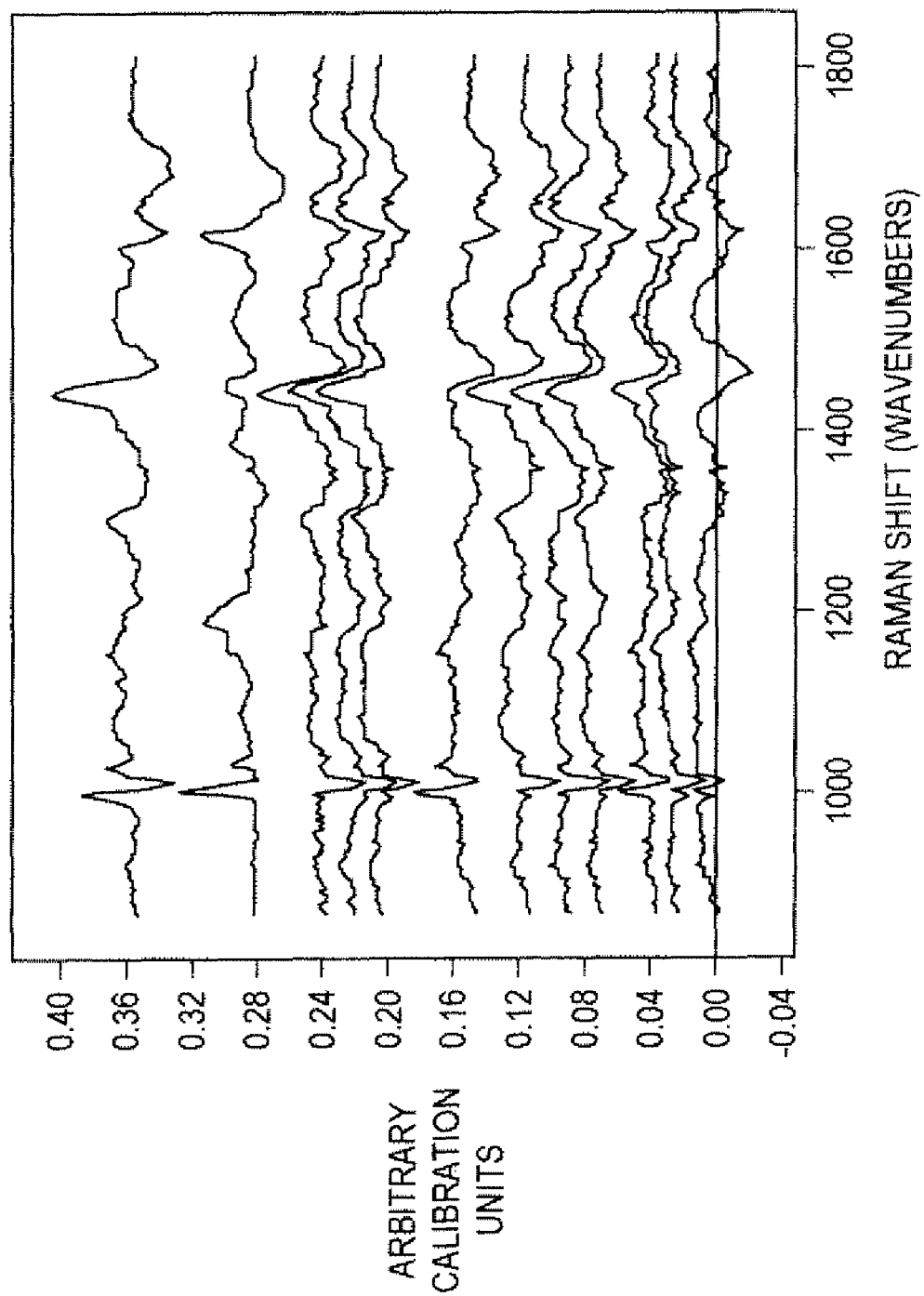
FIG. 26 illustrates twelve (12) difference Raman spectra obtained from the twelve (12) Raman spectra of FIG. 25.
Figure 27:
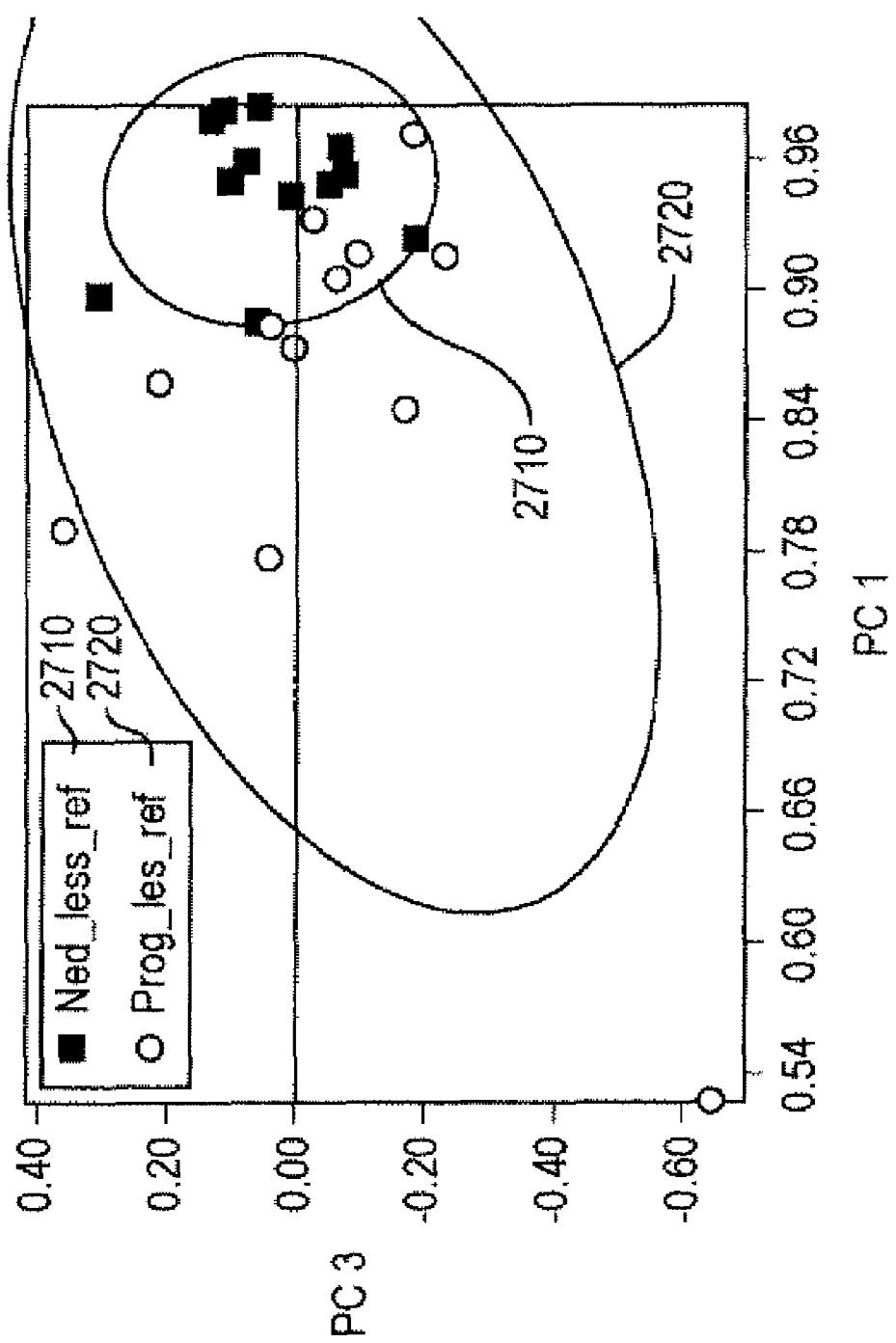
FIG. 27 illustrates an exemplary classification model, based difference Raman spectra data, for tissues samples have a Gleason 7 score with progressive and non-progressive clinical outcome.

This embodiment is exemplified in FIGS. 24-26 using the twelve (12) well characterized progressive and non-progressive tissue samples to generate a pre-determined vector space which may be used in a classification model. FIG. 27 illustrates the predetermined vector space obtained in this fashion for Gleason 7 progressive tissue and Gleason 7 non-progressive tissue. The vector space, shown in FIG. 27, is a projection of the points in Principal Component space onto a single plane. The points labeled 2720 mathematically describe the reference Raman spectra data sets collected for Gleason 7 progressive tissue. The points labeled 2710 mathematically describe the reference Raman spectra data sets collected for Gleason 7 non-progressive tissue. As illustrated in FIG. 27, the points associated with Raman difference spectra for the non-progressive Gleason 7 tissue samples group in a tight circle 2710 and the points associated with Raman difference spectra for the progressive Gleason tissue samples are in a broader circle 2720 and centered to the left of the plot.

The analysis of the distribution of the transformed data may be performed using a number of classification schemes. Some examples of the classification scheme may include: Mahalanobis distance, Adaptive subspace detector, Band target entropy method, Neural network, and support vector machine as an incomplete list of classification schemes known to those skilled in the art.

In one such embodiment, the classification scheme is Mahalanobis distance. The Mahalanobis distance is an established measure of the distance between two sets of points in a multidimensional space that takes into account both the distance between the centers of two groups, but also the spread around each centroid. A Mahalanobis distance model of the data is represented by plots of the distribution of the spectra in the principal component space. The Mahalanobis distance calculation is a general approach to calculating the distance between a single point and a group of points. It is useful because rather than taking the simple distance between the single point and the mean of the group of points, Mahalanobis distance takes into account the distribution of the points in space as part of the distance calculation. The Mahalanobis distance is calculated using the distances between the points in all dimensions of the principal component space.

In one such embodiment, once the test Raman data set is transformed into the space defined by the predetermined PC vector space, the test Raman data set is analyzed relative to the predetermined vector space. This may be performed by calculating a Mahalanobis distance between the test Raman data set transformed into said vector space and the reference Raman difference data sets in said pre-determined vector space.

Figure 7:
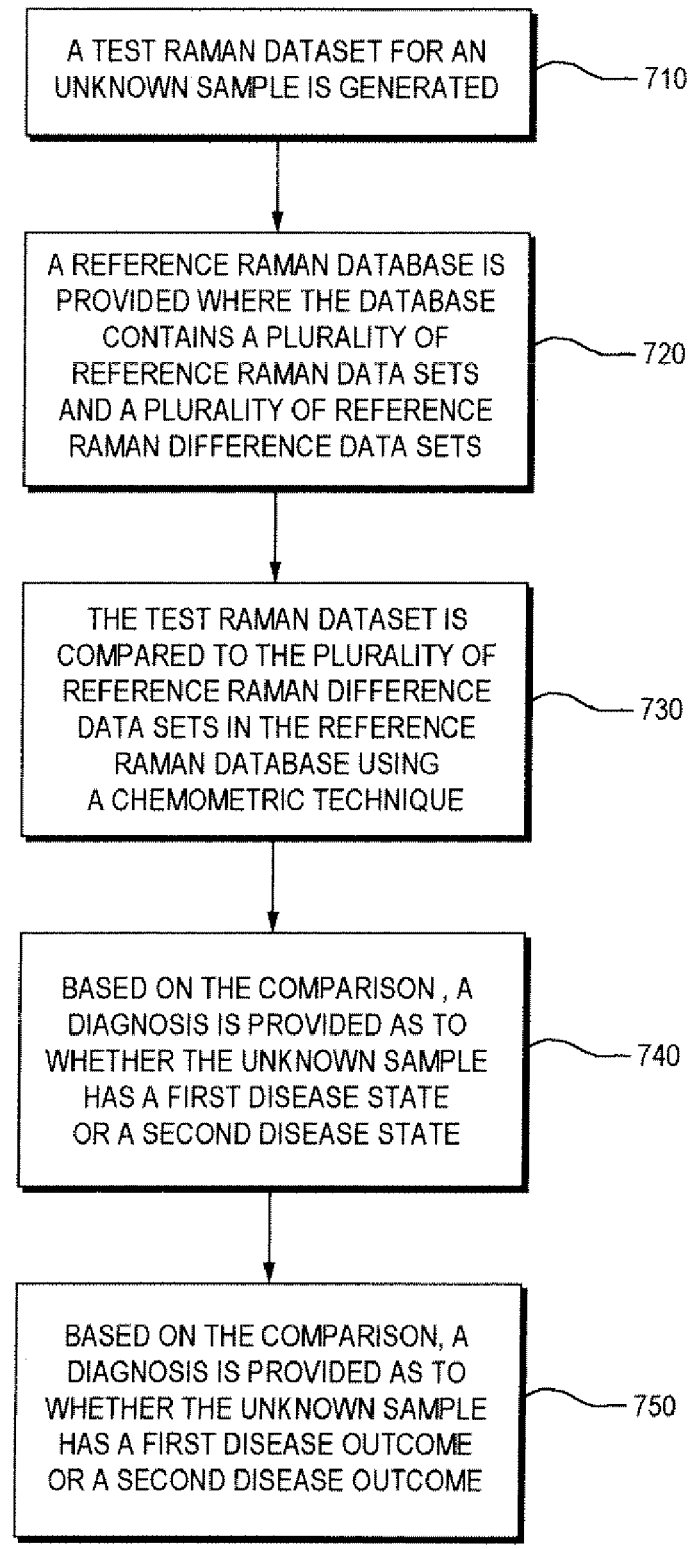
FIG. 7 is a flow chart illustrating an exemplary method of the present disclosure.

The exemplary systems of FIGS. 1 and 2 may be used to perform methods to predict the clinical outcome of patients. Processor 122 is configured to execute program instructions to carry out these methods. One such embodiment is illustrated in FIG. 7 which shows a flow chart for an exemplary method of the present disclosure. In step 710, a test Raman data set is generated for an unknown sample. In one embodiment, the test Raman data set corresponds to a test Raman image. In step 720, a reference Raman database is provided where the database contains a plurality of reference Raman data sets and or a plurality of reference Raman difference data sets. The test Raman dataset is compared to the plurality of reference Raman difference data sets in the reference Raman database using a chemometric technique in step 730. In step 740, a diagnosis is provided of whether the unknown sample has a first disease state or a second disease state based on the comparison of step 730. In further embodiment of this exemplary method, a diagnosis is provided, in step 750, of whether the unknown sample has a first disease outcome or a second disease outcome based on the comparison of step 730.

In one embodiment of FIG. 7, the unknown sample is a prostate tissue sample. In one such embodiment, a first disease state corresponds to a Gleason score 7 and the second disease state corresponds to a Gleason score 9. In another such embodiment, the first disease state corresponds to a Gleason score 4 and the second disease state corresponds to a Gleason score 6. In yet another such embodiment, the first disease state corresponds to a Gleason score 3 and the second disease state corresponds to a Gleason score 5.

As an alternative to using the Gleason score as an indicator of disease state, further embodiments involve the use of the Gleason pattern, as opposed to the score. The Gleason score is calculated as the sum of the two values associated with Gleason patterns within a sample and is therefore a characteristic of a sample of tissue. The Gleason score ranges from 2 to 10. The Gleason pattern is the spatial pattern present in a localized region of a tissue sample. The pattern is determined by the spatial distribution of cells and other tissue structures based on established practice. The Gleason pattern is graded between 1 and 5.

Figure 8:
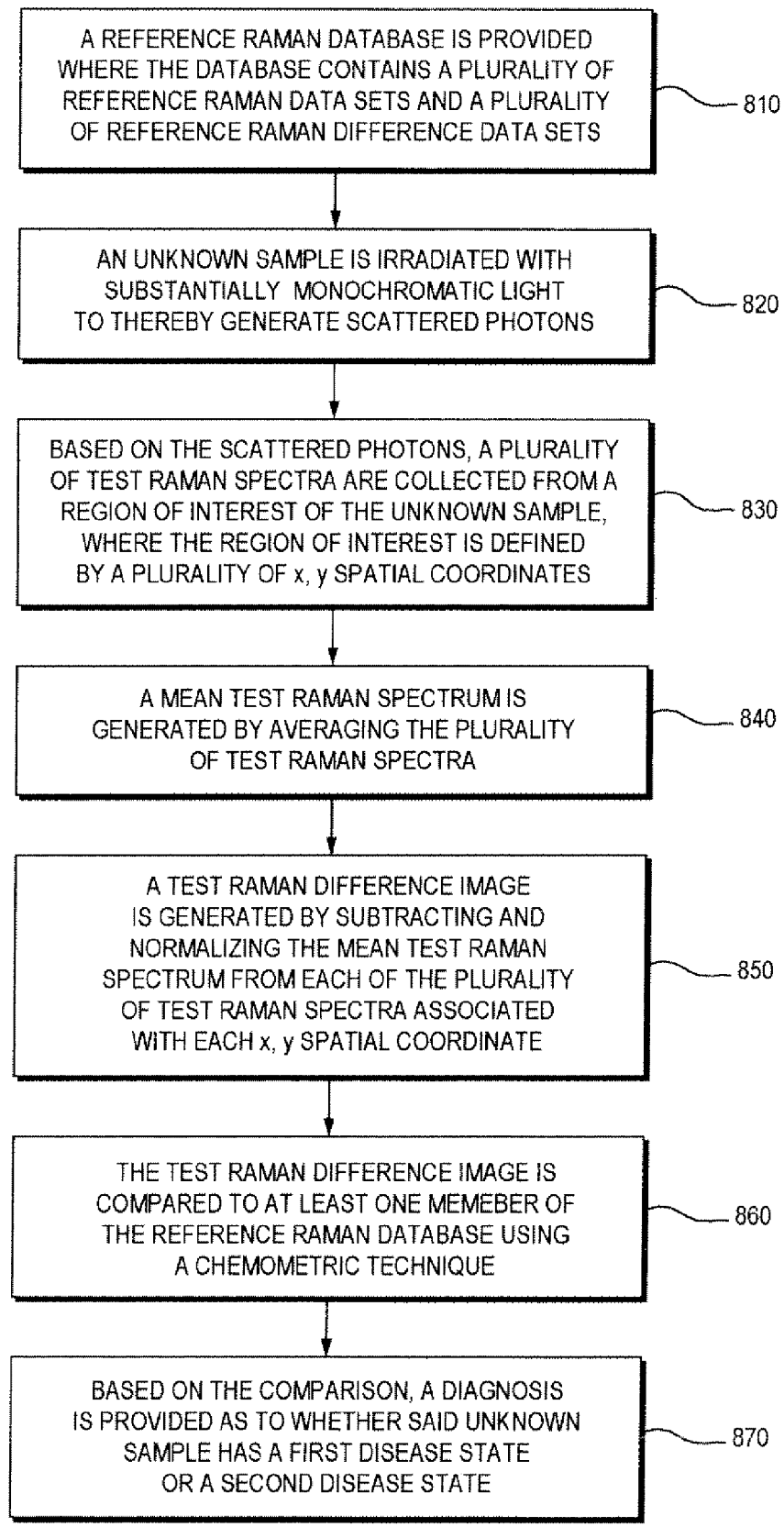
FIG. 8 is a flow chart illustrating an exemplary method of the present disclosure.

In another embodiment, FIG. 8 illustrates a flow chart for another exemplary method of the present disclosure. In step 810, a reference Raman database is provided where the database contains a plurality of reference Raman data sets and or a plurality of reference Raman difference data sets. In step 820, an unknown sample is irradiated with substantially monochromatic light to thereby generate scattered photons. Based on the scattered photons, a plurality of test Raman spectra are collected from a region of interest of the unknown sample, where the region of interest is defined by a plurality of x,y spatial coordinates, in step 830. In step 840, a mean test Raman spectrum is generated by averaging the plurality of test Raman spectra. In step 850, a test Raman difference image is generated by subtracting and normalizing the mean test Raman spectrum from each of the plurality of test Raman spectra associated with each x,y spatial coordinate. The test Raman difference image is compared to at least one member of the reference Raman database using a chemometric technique, in step 860. Based on the comparison of step 860, a diagnosis is provided as to whether the unknown sample has a first disease state or a second disease state, in step 870. There are specific reasons for using the difference spectrum generated by averaging all of the spectra from an unknown sample and subtracting it from each of the spectra of the image to generate a Raman difference image. This process will in general remove common features from the set of data. One example of a common feature is to account for instrumental variances which occur during the data acquisition and will be present at some level in each of the test spectra. A second example of a common feature can be based in a biological difference such as diet or environmental exposure. In such an example each cell will have had the same exposure (whether it is from diet or environment as examples). By subtracting the mean, this common feature will be substantially removed from the data allowing differences such a disease type or those between non-progressive and progressive cancer to become more prominent.

Figure 9:
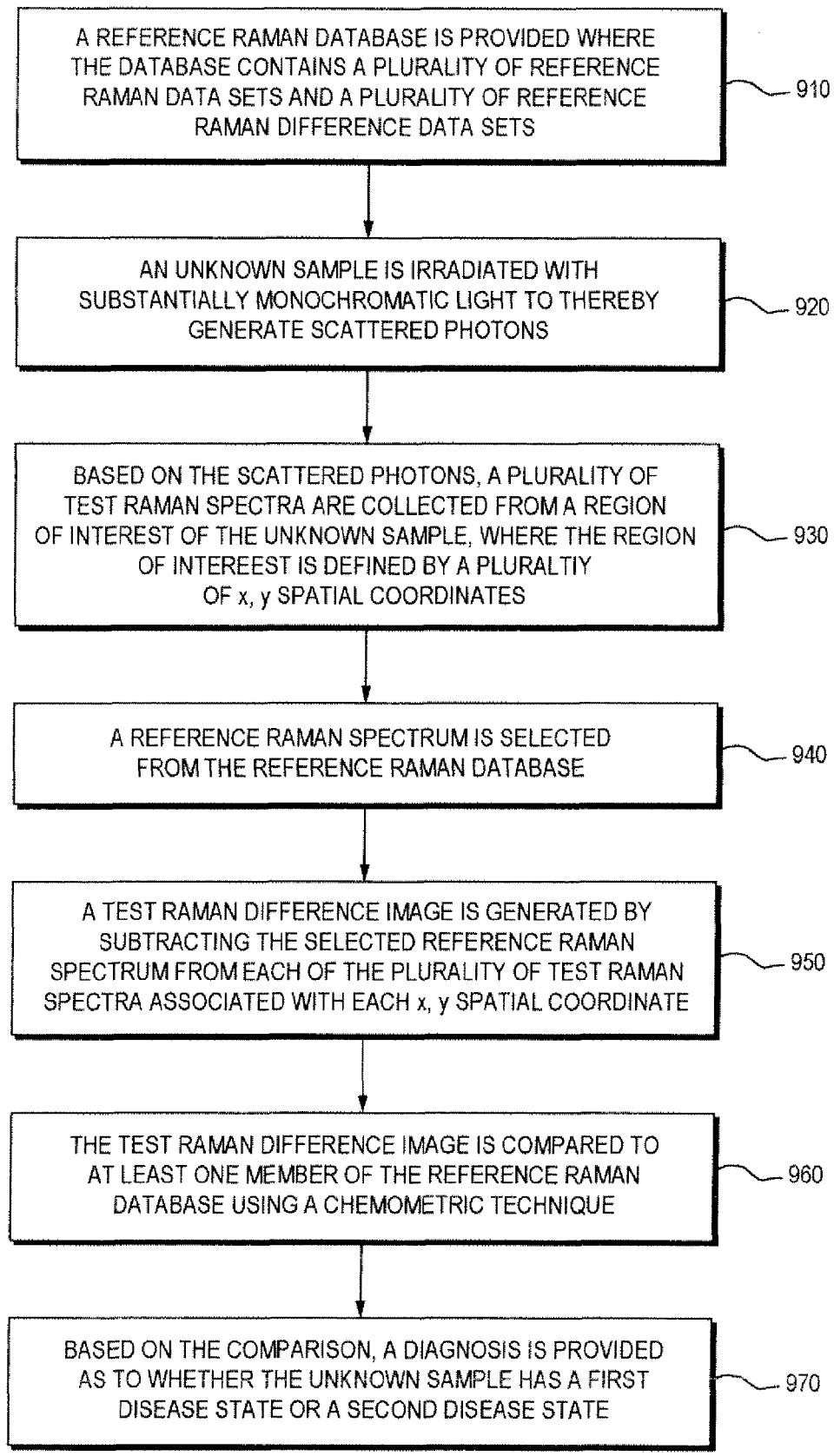
FIG. 9 is a flow chart illustrating an exemplary method of the present disclosure.

In yet another embodiment, FIG. 9 illustrates a flow chart for another exemplary method of the present invention. In step 910, a reference Raman database is provided where the database contains a plurality of reference Raman data sets and or a plurality of reference Raman difference data sets. Each reference Raman spectrum is associated with a known sample and an associated known disease state and/or an associated known clinical outcome. In step 920, an unknown sample is irradiated with substantially monochromatic light to thereby generate scattered photons. Based on the scattered photons, a plurality of test Raman spectra are collected from a region of interest of the unknown sample, where the region of interest is defined by a plurality of x,y spatial coordinates, in step 930. In step 940, a reference Raman spectrum is selected from the Raman database. In step 950, a test Raman difference image is generated by normalizing and subtracting the selected reference Raman spectrum from each of the plurality of test Raman spectra associated with each x,y spatial coordinate. In one embodiment, the selected reference Raman spectrum is associated with a known prostate sample having an associated known Gleason score. The test Raman difference image is compared to at least one member of the reference Raman database using a chemometric technique, in step 960. Based on the comparison of step 960, a diagnosis is provided as to whether the unknown sample has a first disease state or a second disease state, in step 970. In further embodiment of this exemplary method, a diagnosis is provided, in step 970, of whether the unknown sample has a first disease outcome or a second disease outcome based on the comparison of step 960.

In one embodiment of FIG. 9, the unknown sample is a prostate tissue sample. In one such embodiment, the reference Raman spectrum corresponds to a known sample having a Gleason pattern or score 3. In another such embodiment, the reference Raman spectrum corresponds to a known sample having a Gleason pattern or score 4. In yet another such embodiment the reference Raman spectrum corresponds to a known sample having a Gleason pattern or score 5. In still another such embodiment, the reference Raman spectrum corresponds to a known sample having a Gleason score 6. In still yet another such embodiment, the reference Raman spectrum corresponds to a known sample having a Gleason score 7. In another such embodiment, the reference Raman spectrum corresponds to a known sample having a Gleason score 8. In another such embodiment, the reference Raman spectrum corresponds to a known sample having a Gleason score 9. In another such embodiment, the reference Raman spectrum corresponds to a known sample having a Gleason pattern 1. In another such embodiment, the reference Raman spectrum corresponds to a known sample having a Gleason pattern 2.

EXAMPLES

The following examples demonstrate the method and system of the present disclosure.

The samples discussed in the below examples were tissue samples prepared using standard histology techniques from paraffin embedded tissue sections which reside in a clinical sample database. Five (5) micron thick sections were prepared and placed on an aluminum side of an aluminum coated glass slide. Paraffin was removed using standard procedures and solvents. An adjacent section was prepared in standard fashion and stained with hematoxalin and Eosin for routine pathology analysis. Expert pathologists reviewed each sample and confirmed the Gleason scoring.

Raman spectra, under widefield illumination conditions, were obtained for each of the twenty tissue areas using the Falcon II™ Raman imaging system from ChemImage Corporation of Pittsburgh, Pa. Typical Raman dispersive spectra were collected from cells using 595 W/cm² laser power density, 100× objective, and appropriate exposure times to get good signal to noise (typically 10-60 s). Baseline, dark current and bias corrections were applied to the acquired spectra. Spectral processing and data analysis was performed using ChemImage Xpert™ 2.0 software available from ChemImage Corporation of Pittsburgh, Pa. Typical spatially accurate wavelength resolved Raman chemical images were acquired using 514 W/cm² laser power density, 50× objective, 8×8 binning, and 1.5 s exposure time, and 5 averages over the spectral range of 600-3200 cm$^{-1}$. These parameters are typical for the data discussed below.

Example 1

Figure 10:
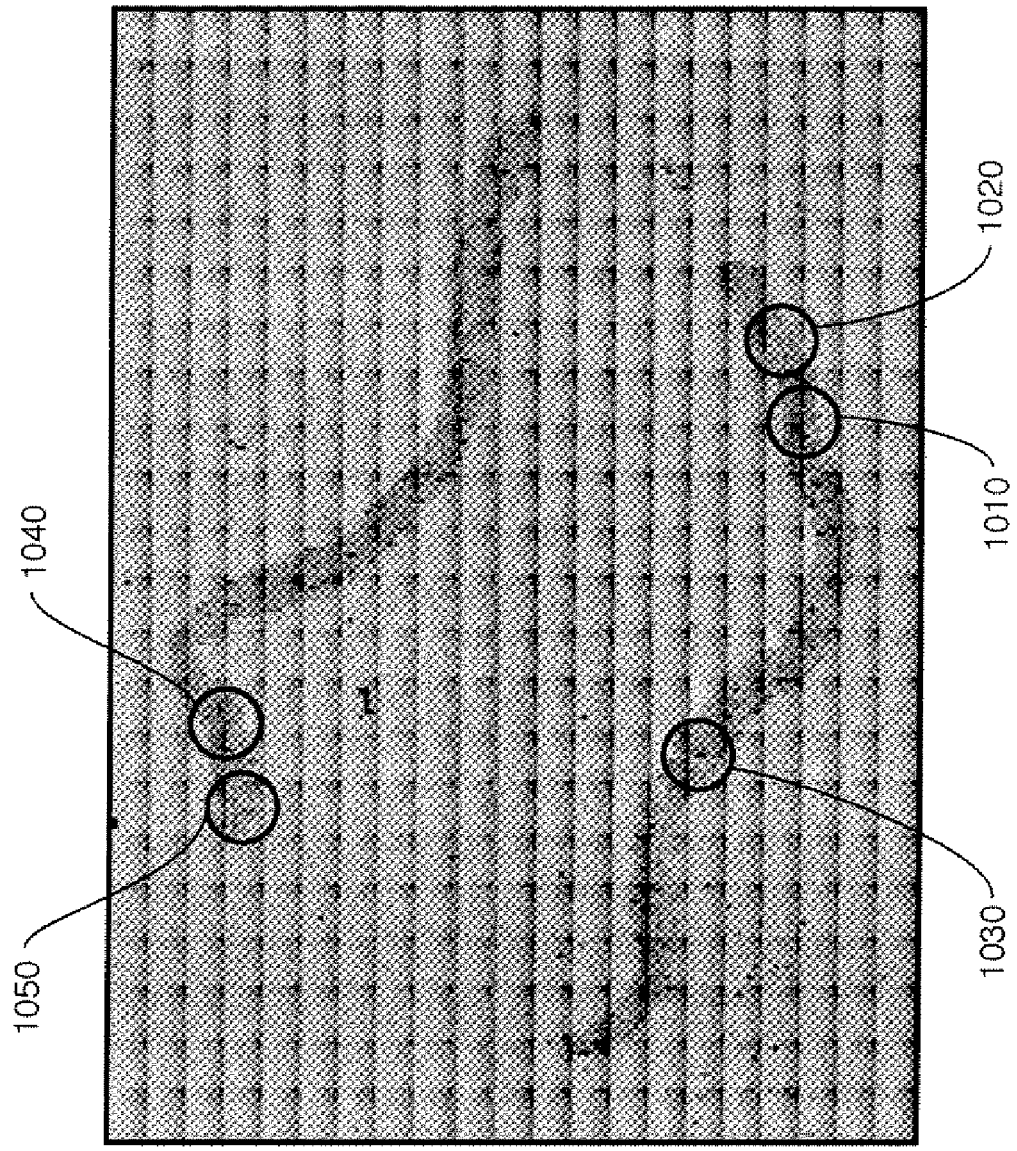
FIG. 10 illustrates several regions of interest from a cancerous prostate tissue sample graded with a Gleason score of 9.

FIG. 10 depicts a video (brightfield) image, collected using a ChemImage Falcon II™ Wide-Field Raman Chemical Imaging System, of two core-biopsies taken from a cancerous prostate tissue. The tissue had been graded, by a pathologist with a Gleason score of 9 ("GS 9"). Various regions of interest (ROIs) 1010, 1020, 1030, 1040 and 1050 are indicated by circles and corresponding numerals, and discussed in more detail below.

Figure 11A:
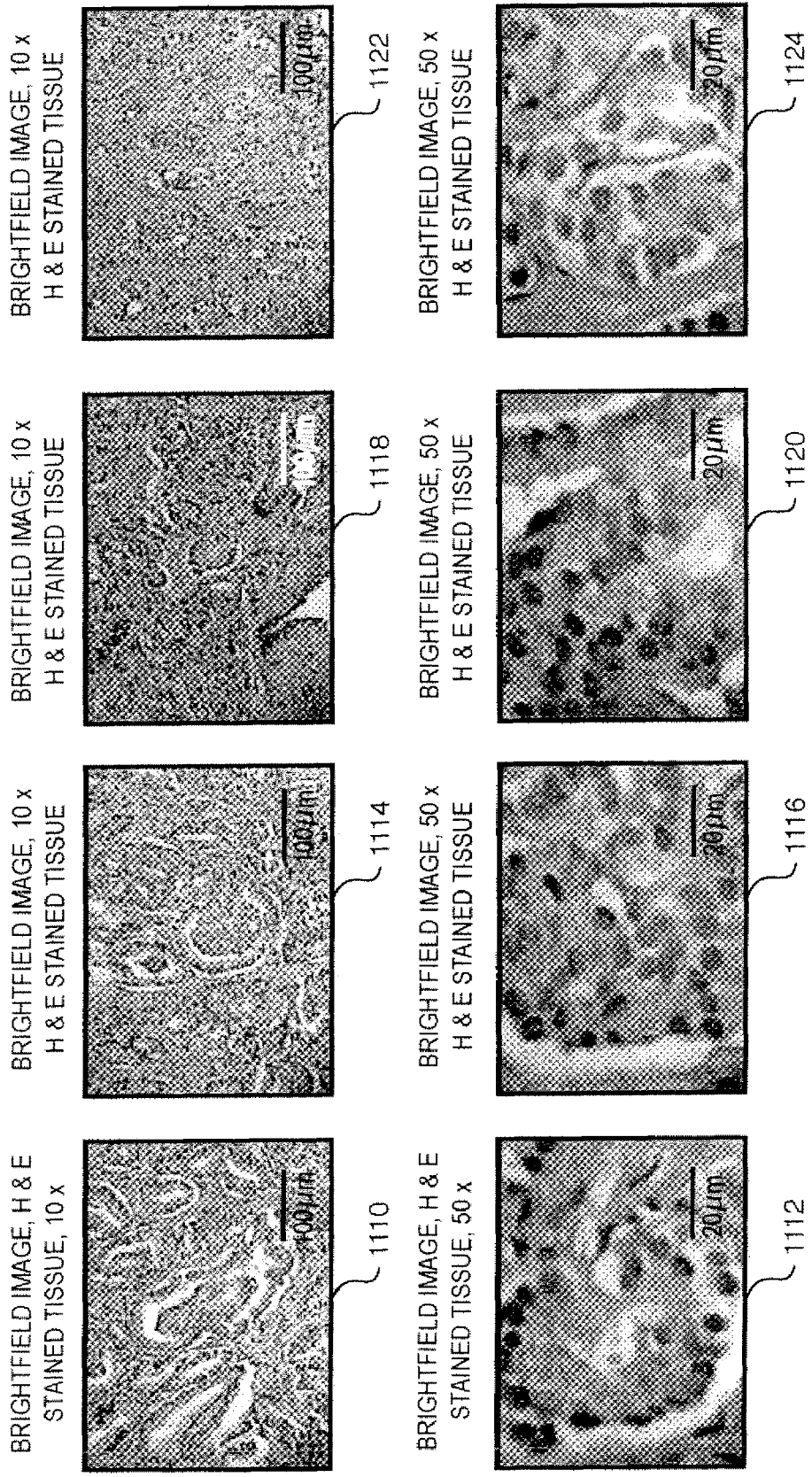
FIGS. 11A and 11B illustrate several bright field images magnified at 10× and 50× for the various regions of interest shown in FIG. 10.
Figure 11B:
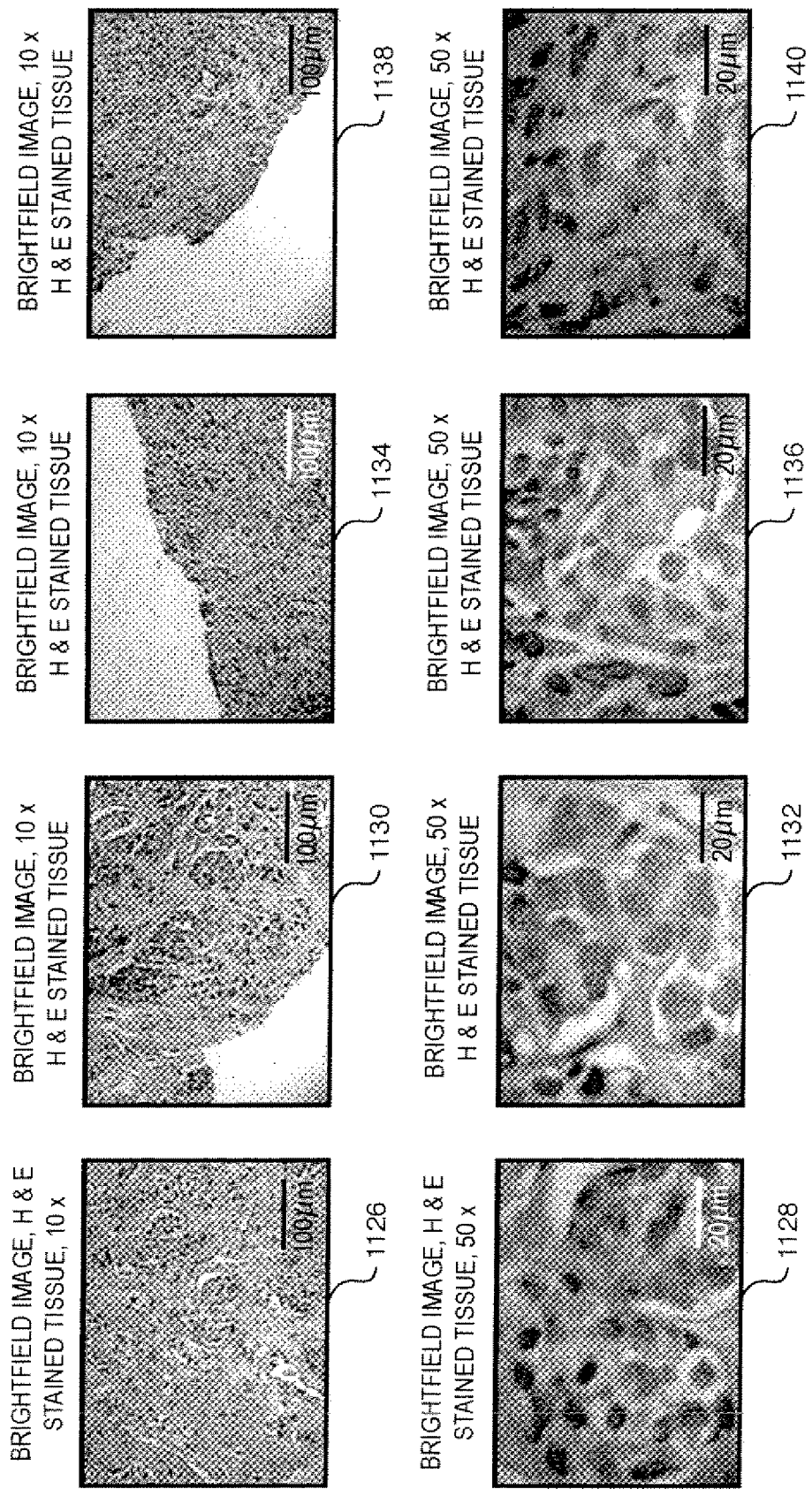

FIGS. 11A and 11B depicts bright field images at two different magnifications, 1110, 1114, 1118, 1122, 1126, 1130, 1134 and 1138 at 10× and 1112, 1116, 1120, 1124, 1128, 1132, 1136 and 1140 at 50×, of the ROIs identified in FIG. 10. To obtain the images in FIGS. 11A and 11B, the prostate tissue sections depicted in FIG. 10 were stained with Hemotoxylin and Eosin (H&E) after the image of FIG. 10 was obtained. The brightfield images of the stained tissue (in FIGS. 11A and 11B) were collected with the Falcon II™ imaging system mentioned above.

FIG. 12 illustrates two plots of the Raman dispersive spectra obtained from the ROIs, 1010, 1020, 1030, 1040 and 1050 identified in FIG. 10. Raman dispersive spectra were acquired on the ChemImage Falcon II™ imaging system with 532 nm excitation using 50× objective magnification. In FIG. 12A, the mean Raman spectrum 1210 often (10) dispersive spectra (from ten regions of interest in FIG. 10) is plotted along with two other Raman spectra 1220, 1230 that take into account the standard deviation among the ten dispersive spectra from ten different regions of interest. It is noted here that there is very small standard deviation from one spectrum to another in the set of ten dispersive spectra—as can be seen from the significant overlap among the spectra in this plot. The fingerprint (FP) region of all ten dispersive spectra 1120 (entire spectra not shown) is shown in FIG. 122B to indicate substantial similarity among the spectra from different ROIs, 1010, 1020, 1030, 1040 and 1050. The data of FIGS. 11A and 11B demonstrate that the variance between Raman spectra across several regions of GS 9 tissue is low.

Example 2

Figure 13:
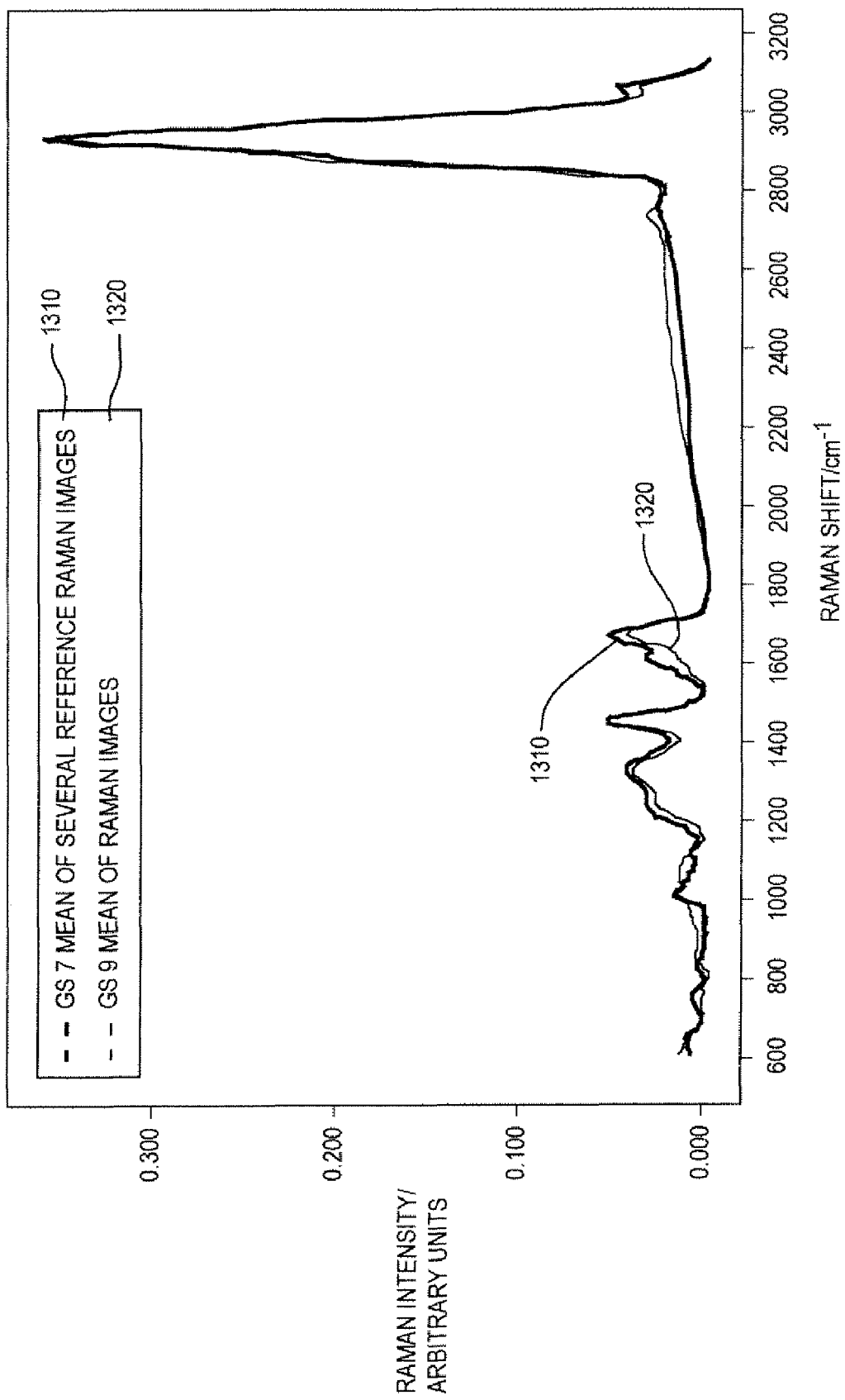
FIG. 13 illustrates a mean Raman spectrum for a region of interest in FIG. 10 and a mean Raman spectrum obtained for a sample having a Gleason score of 7.

FIG. 13 illustrates a comparison of two Raman image spectra—spectrum 1310 representing a mean of six image spectra of six of the eight GS 9 ROIs shown in FIGS. 11A and 11B, and the other spectrum 1320 representing a mean of several reference Raman image spectra from prostate cancer tissues graded at GS 7. An image Raman spectrum corresponds to a Raman spectrum associated with a particular pixel (or x,y spatial coordinate). A mean image Raman spectrum is generated by determining the mean for all Raman spectra associated with each x,y spatial coordinate for a region of interest. A comparison of mean image spectrum 1310 and mean image spectrum 1320 indicates that although the mean GS 7 spectrum 1310 is substantially similar to the mean GS 9 spectrum 1320, there are still a number of relevant and significant differences between the two spectra. Therefore, it may be desirable to identify differences between the GS 7 and GS 9 spectra in FIG. 13, and use that difference information to identify one or more factors that may cause a GS 7 cell to progress into the GS 9 state. Such predictive approach may further assist a medical professional to identify progressive behavior of the cancerous cell at an early stage, which can lead to better diagnosis and treatment of the cancer before it is too late (e.g., before the cancer has reached the GS 9 stage).

Using the mean GS 9 spectrum and the mean GS 7 spectrum, a difference (GS9–GS7) spectrum was generated. FIG. 4 illustrates the difference spectrum 430 obtained by determining the difference between a GS7 spectrum 410 and a GS 9 spectrum 420.

Example 3

Based on the differences between the GS9 spectrum 410 and GS7 spectrum 420 (as indicated by the GS9 minus GS7 difference spectrum 430), a pixel-by-pixel spectral mixture resolution (SMR) may be carried out on an unknown test Raman data set, as a test Raman image, using the ChemImage Xpert™ software to obtain additional information about distinctions between the GS7 and GS9 spectra.

Figure 14:
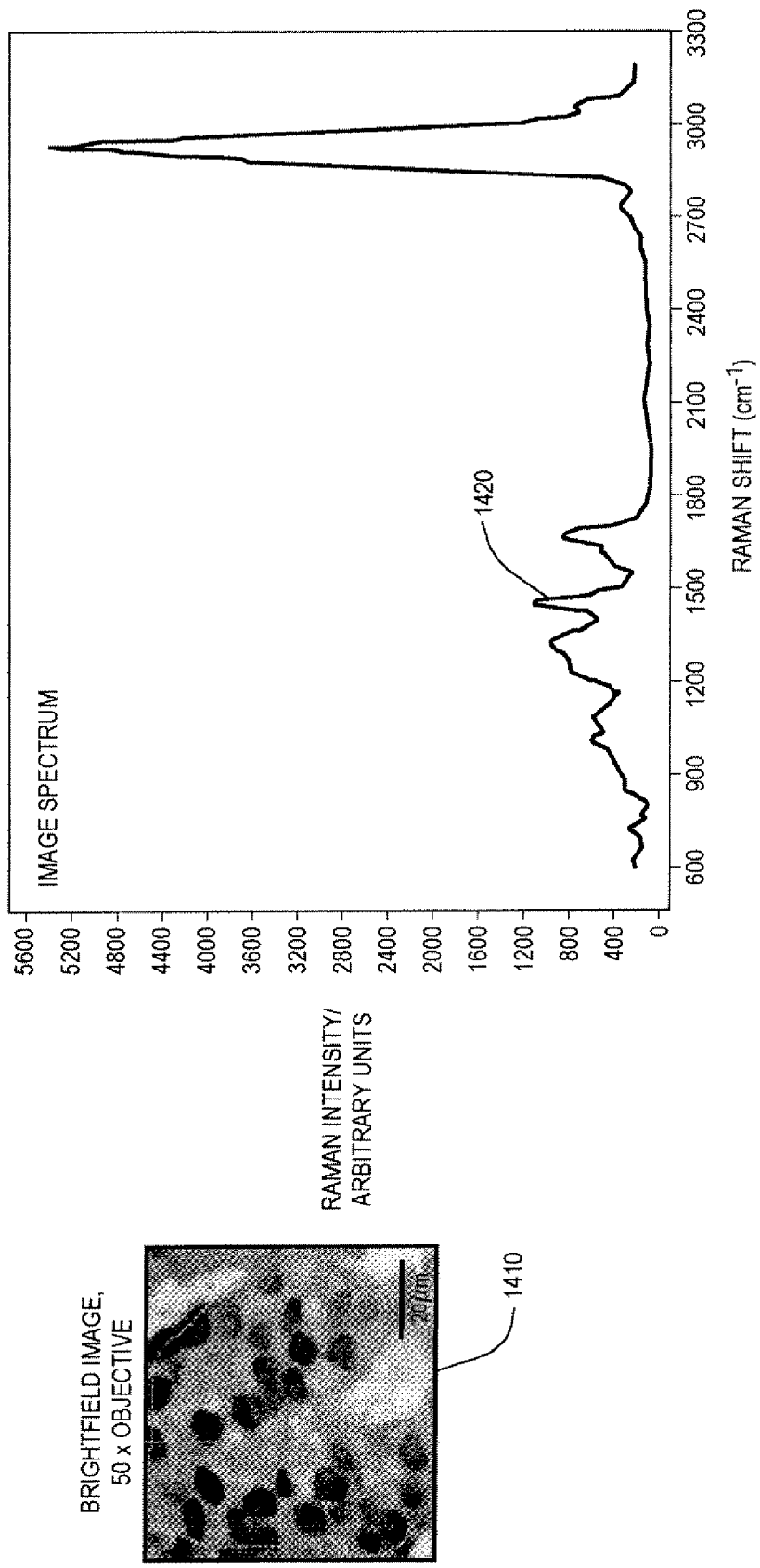
FIG. 14 illustrates a bright field image and a mean Raman spectrum for a region of interest of FIG. 10.

FIG. 14 reproduces the 50× brightfield image 1410 of the region of interest 1010 shown in FIG. 10 (for a GS 9 sample) along with the average Raman spectrum 1420 corresponding to the cells in selected ROI 1010.

FIG. 15 shows the Raman image 1520 of ROI 1010 at its brightest frame (2930 cm$^{-1}$) compared with the bright field image 1410. Beneath images 1410, 1520 are the concentration images 1530, 1540, 1550 which result from the SMR analysis of the full Raman image (including all wave numbers of interest) of ROI 1010, depicted by concentration image for each unmixed component. Brighter pixels (i.e., closer in color to white) represent a higher concentration of the corresponding component (e.g., GS7 spectrum, or GS9 spectrum, or GS9 minus GS7 spectrum) in a frame. Concentration image 1530, of the GS 9 component, contains mostly white pixels, indicating that the majority of the Raman signal from ROI 1010 represents GS 9 prostate cancer. Concentration image 1540 illustrates the GS 7 component present in the Raman image of ROI 1010. Concentration image 1550 of ROI 1010 illustrates the difference component present in the Raman image of ROI 1010. The area 1560, highlighted with an arrow, may represent the components associated with the difference spectrum 430.

Example 4

Figure 16:
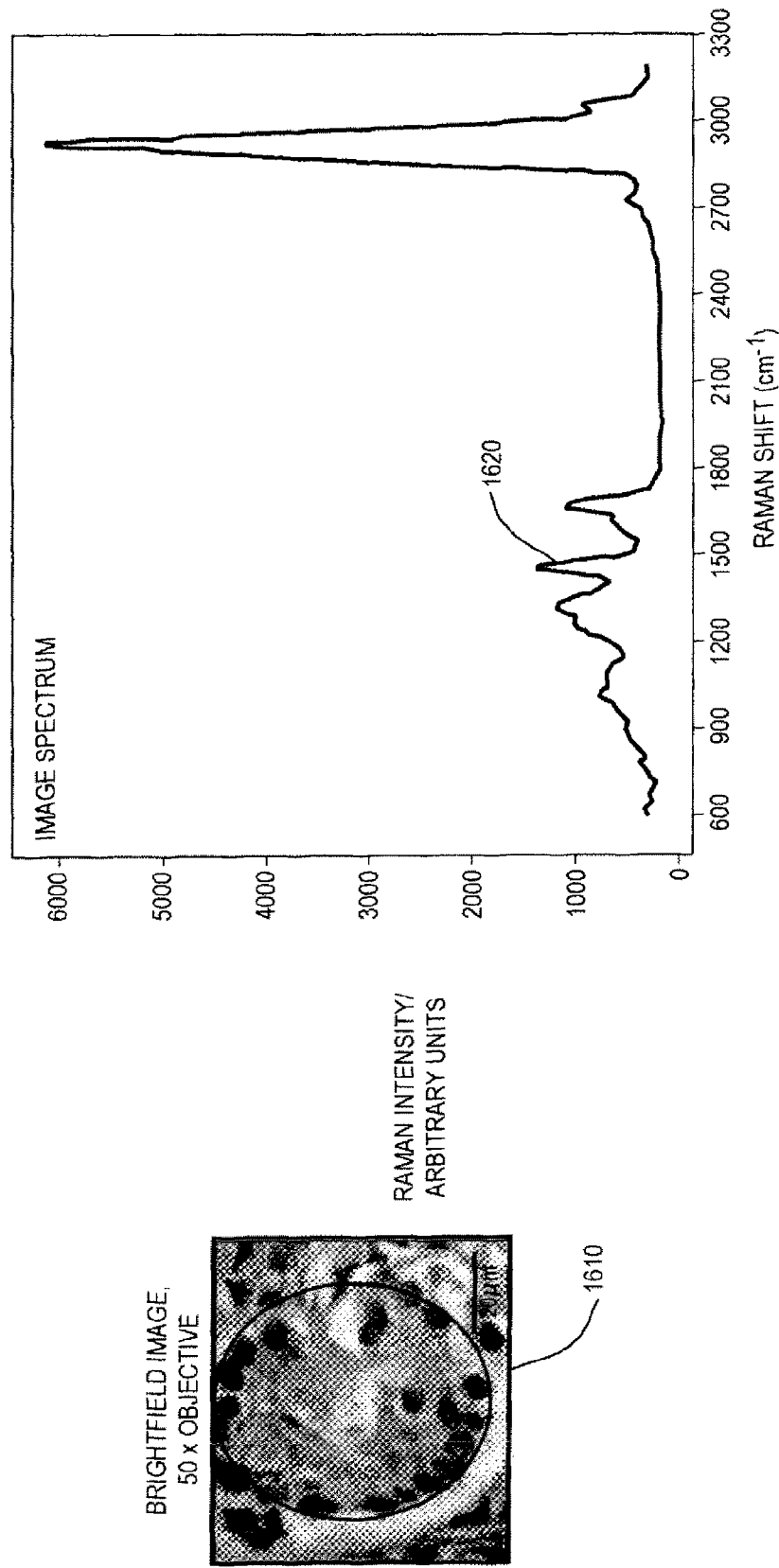
FIG. 16 illustrates a bright field image and a mean Raman spectrum for a region of interest of FIG. 10.

FIG. 16 reproduces the 50× brightfield image 1610 of the region of interest 1020 shown in FIG. 10 (for a GS 9 sample) along with the average Raman spectrum 1620 corresponding to the cells in ROI 1020.

Figure 17:
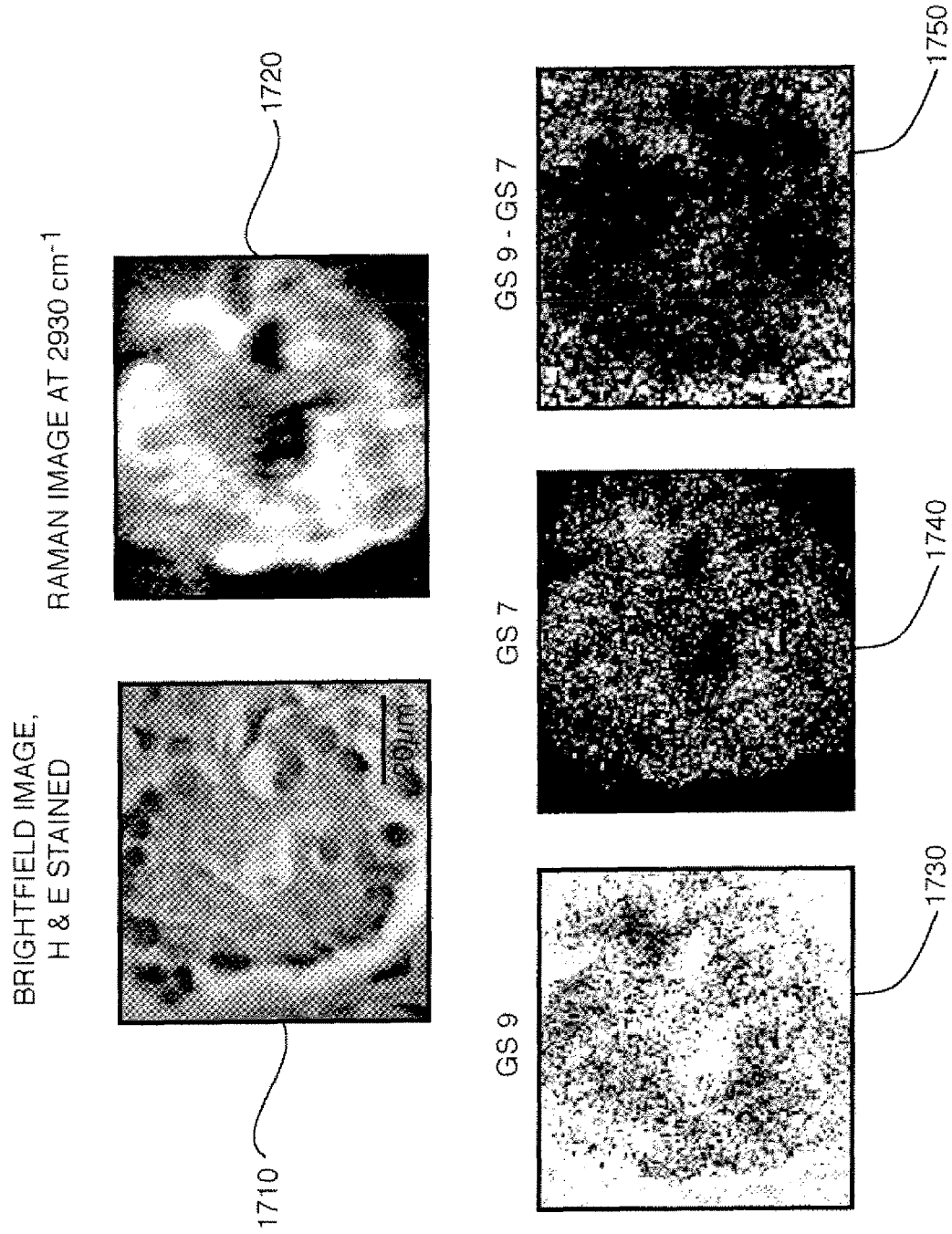
FIG. 17 illustrates concentration images obtained by applying spectra mixture resolution to a Raman image using a spectrum for a Gleason 7 sample, a spectrum for a Gleason 9 sample and a difference spectrum.

FIG. 17 shows the Raman image 1720 of ROI 1020 at its brightest frame (2930 cm$^{-1}$) compared with the bright field image 1610. SMR analysis of Raman image 1720, of ROI 1020, results in concentration images, 1730, 1740, 1750, for each unmixed component. A concentration image encompasses all of the spectral information, not just one single Raman shift. Concentration image 1730, of the GS 9 component, contains a mixture of white pixels and black pixels. Concentration image 1740 illustrates the GS 7 component present in the Raman image of ROI 1010. Concentration image 1750 of ROI 1020 illustrates the difference component present in the Raman image of ROI 1020 indicating there is no concentrated region of Raman signal matching the difference spectrum.

Example 5

The results of the SMR analyses of ROIs 1010 and 1030 both show that there may be some interfering signal manifesting from areas outside the tissue of interest. This is most evident in FIGS. 15 and 17 in the SMR concentration images representing the difference spectra. Therefore, the SMR analysis on ROIs 1020 and 1030 were carried out after the areas not applicable to the analysis were masked out of the images. Masking the data may ensure that SMR carried out on these tissue ROIs is not hindered by interferences such as, for example, from molecules not contained in the reference spectra. Furthermore, data masking may ensure that the results correspond to the tissue of interest only. Masking of image data was carried out using the ChemImage Xpert software.

Figure 18:
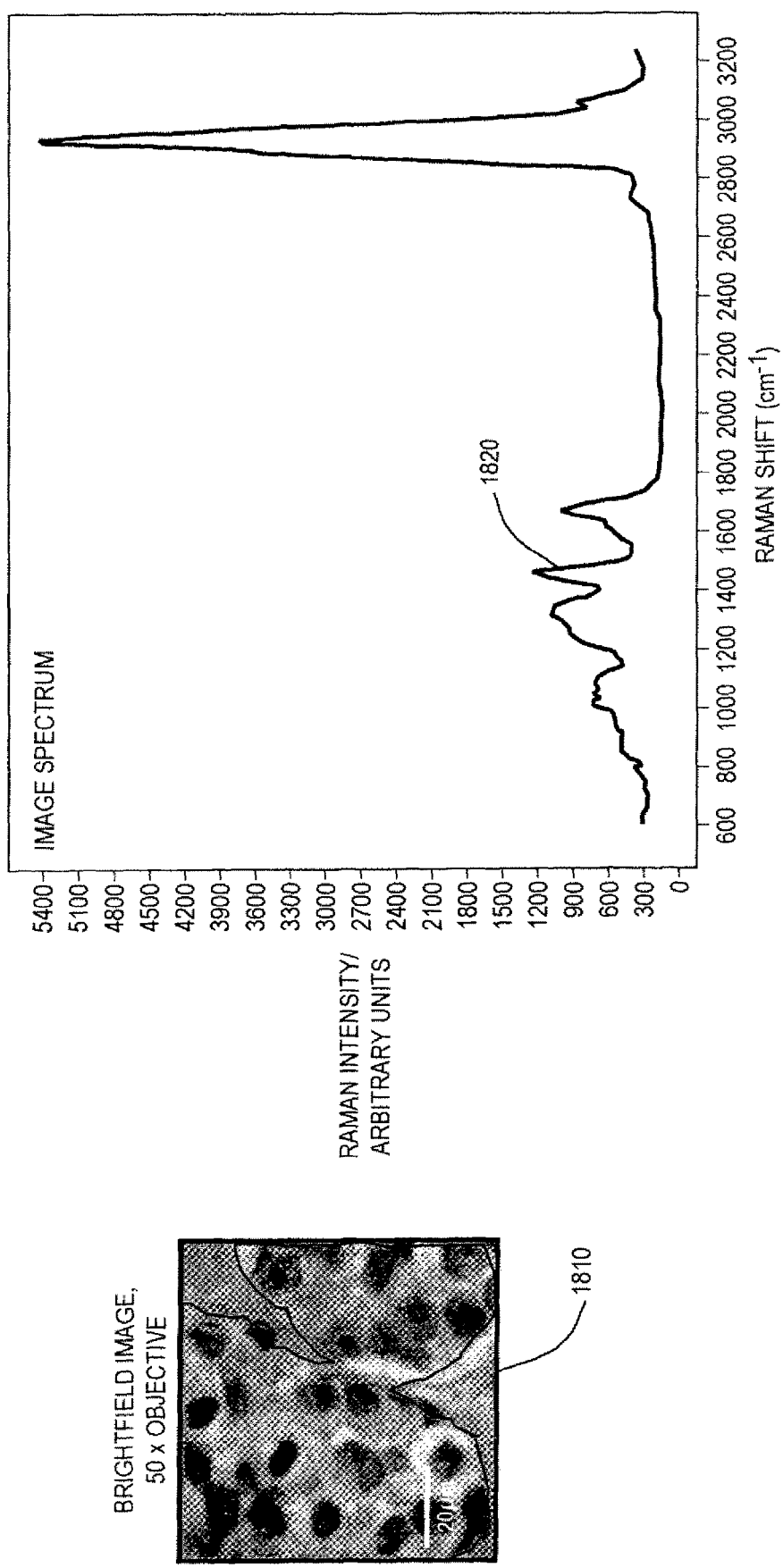
FIG. 18 illustrates a bright field image and a mean Raman spectrum for a region of interest of FIG. 10.

FIG. 18 shows the bright field H & E stained tissue image 1810 and Raman image spectrum 1820 of ROI 1030 prostate tissue. The region 1830 in the tissue represented by spectrum 1820 is outlined in the H & E stained tissue image 1810. The bright field H & E stained tissue image 1810 is reproduced in FIG. 19 and compared with the Raman image 1920 at its brightest frame (2930 cm$^{-1}$) and with the interfering components of the image masked off. In this Raman image 1920, all of the black regions have an intensity of zero and therefore are not factored into the data analysis. SMR concentration image 1930, of the full Raman image (at a wave number range of 500-3200 cm$^{-1}$) of ROI 1030 show the distribution in the tissue of GS 9. Concentration image 1940, of the full Raman image shows the distribution of GS 7 tissue. Concentration image 1950 illustrates the difference component (GS9–GS7) shown around the edges of the tissue 1960, present in the Raman image of ROI 1030.

Figure 19:
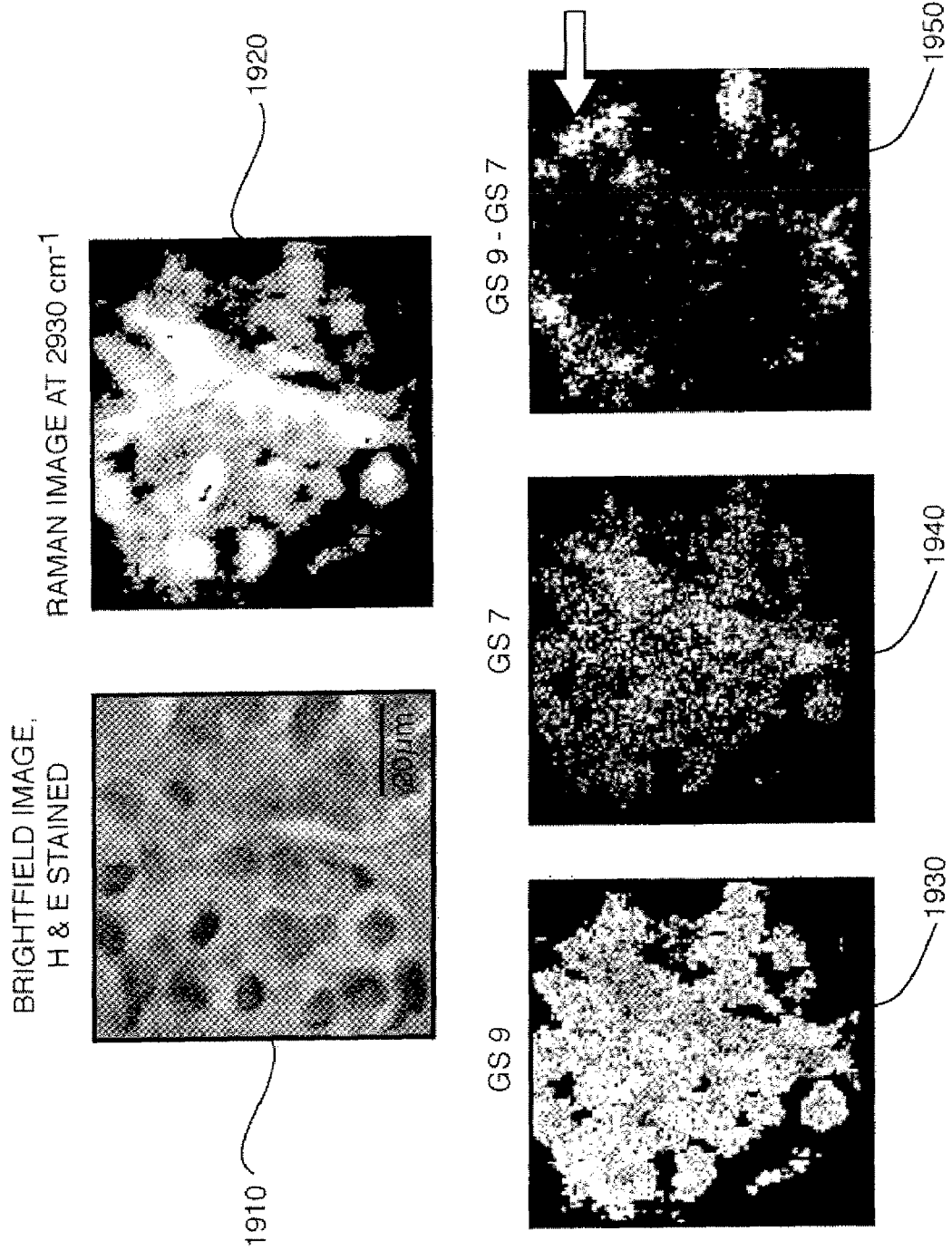
FIG. 19 illustrates concentration images obtained by applying spectra mixture resolution to a Raman image using a spectrum for a Gleason 7 sample, a spectrum for a Gleason 9 sample and a difference spectrum where a masking technique is applied to mask interfering components.

The data of FIG. 19 indicate that masking the non-essential data from the SMR analysis highlights the significant data and therefore enables more precise analysis and interpretation.

Example 6

Figure 20:
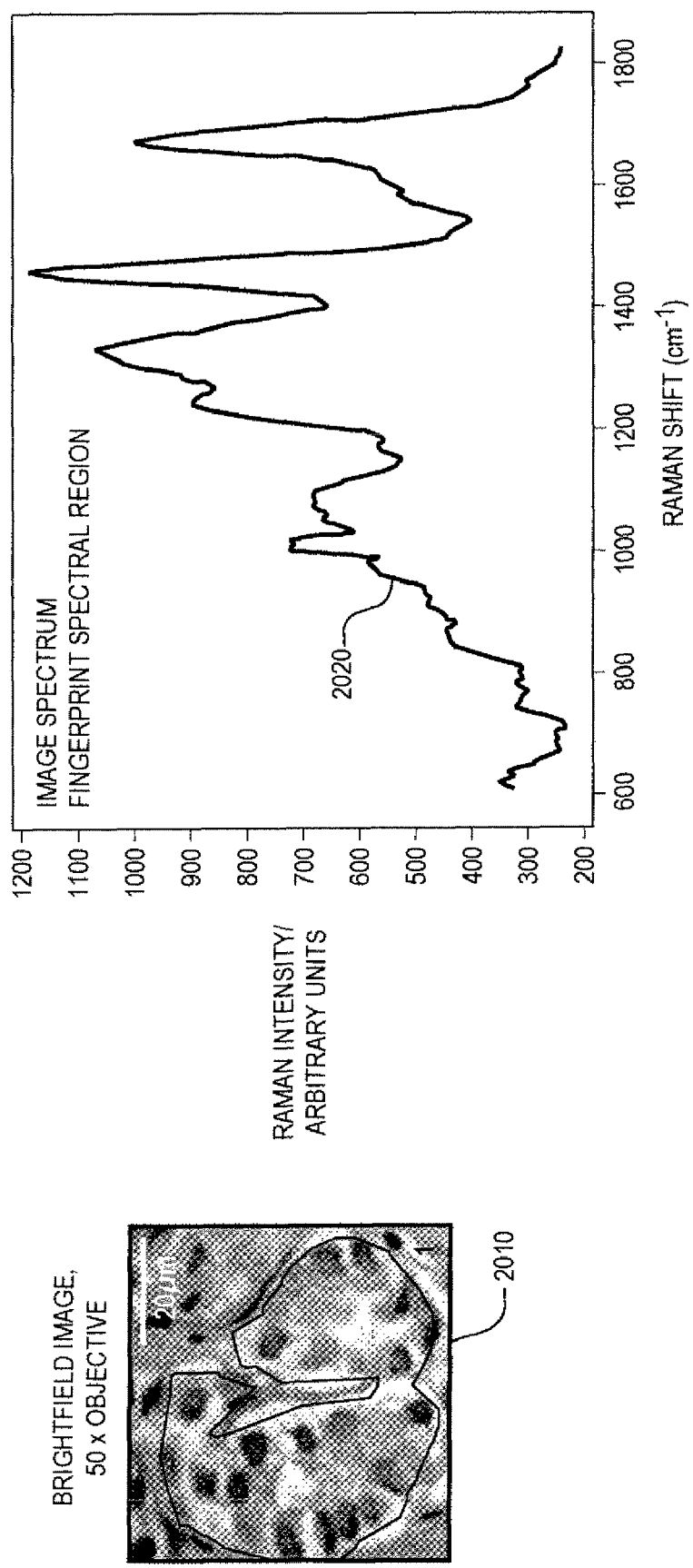
FIG. 20 illustrates a bright field image and a mean Raman spectrum, taken at Raman shift values ranging from 600-1850 $cm^{-1}$ for a region of interest of FIG. 10.

It is well known that highly characteristic data can be found within the fingerprint region—e.g. between 600-1850 cm$^{-1}$ in one embodiment. FIG. 20 shows the average image spectrum 2020 of ROI 1020 along with the brightfield image 2010 of ROI 1020 in the finger print region of Raman shift values ranging from 600-1850 cm$^{-1}$.

Figure 21:
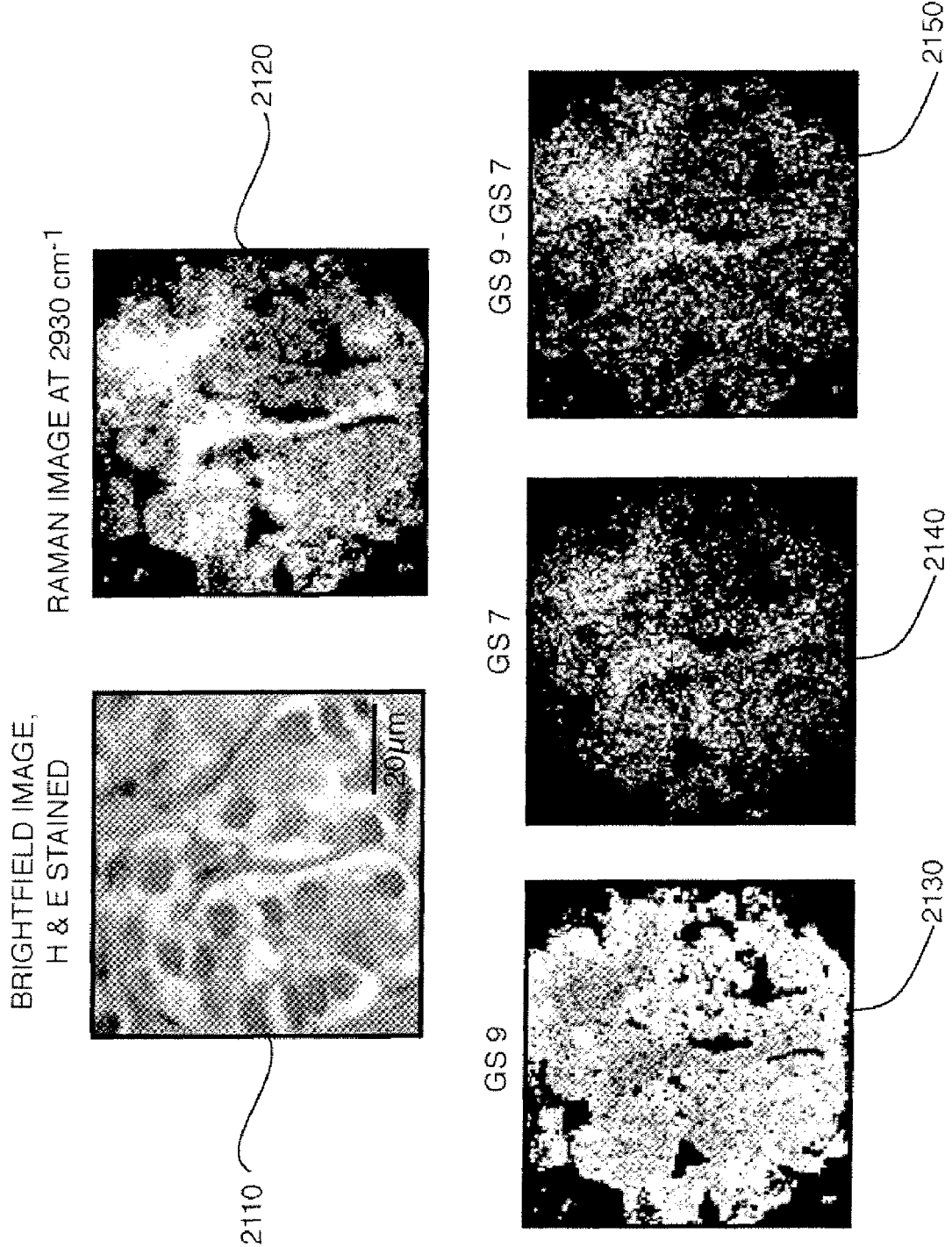
FIG. 21 illustrates concentration images obtained by applying spectra mixture resolution to a Raman image, taken at Raman shift values ranging from 600-1850 $cm^{-1}$ using a spectrum for a Gleason 7 sample, a spectrum for a Gleason 9 sample and a difference spectrum where a masking technique is applied to mask interfering components.

FIG. 21 illustrates the SMR analysis of this tissue over the fingerprint region with interference data masked off. Concentration image 2130, of ROI 1020, shows the distribution of the tissue of GS 9. Concentration image 2140 shows the distribution of GS 7 tissue. Concentration image 2150 illustrates the difference component. This data indicates that using a smaller spectral region (e.g., a fingerprint region) to conduct the analysis may provide additional informative results.

Examples 1-6 demonstrate that a difference Raman spectrum may be useful to identify biological factors which contribute to development disease states. Second, a difference Raman spectrum may be used to detect areas in a tissue sample containing the chemical components which contribute to the development of difference disease states.

Example 7

Figure 22:
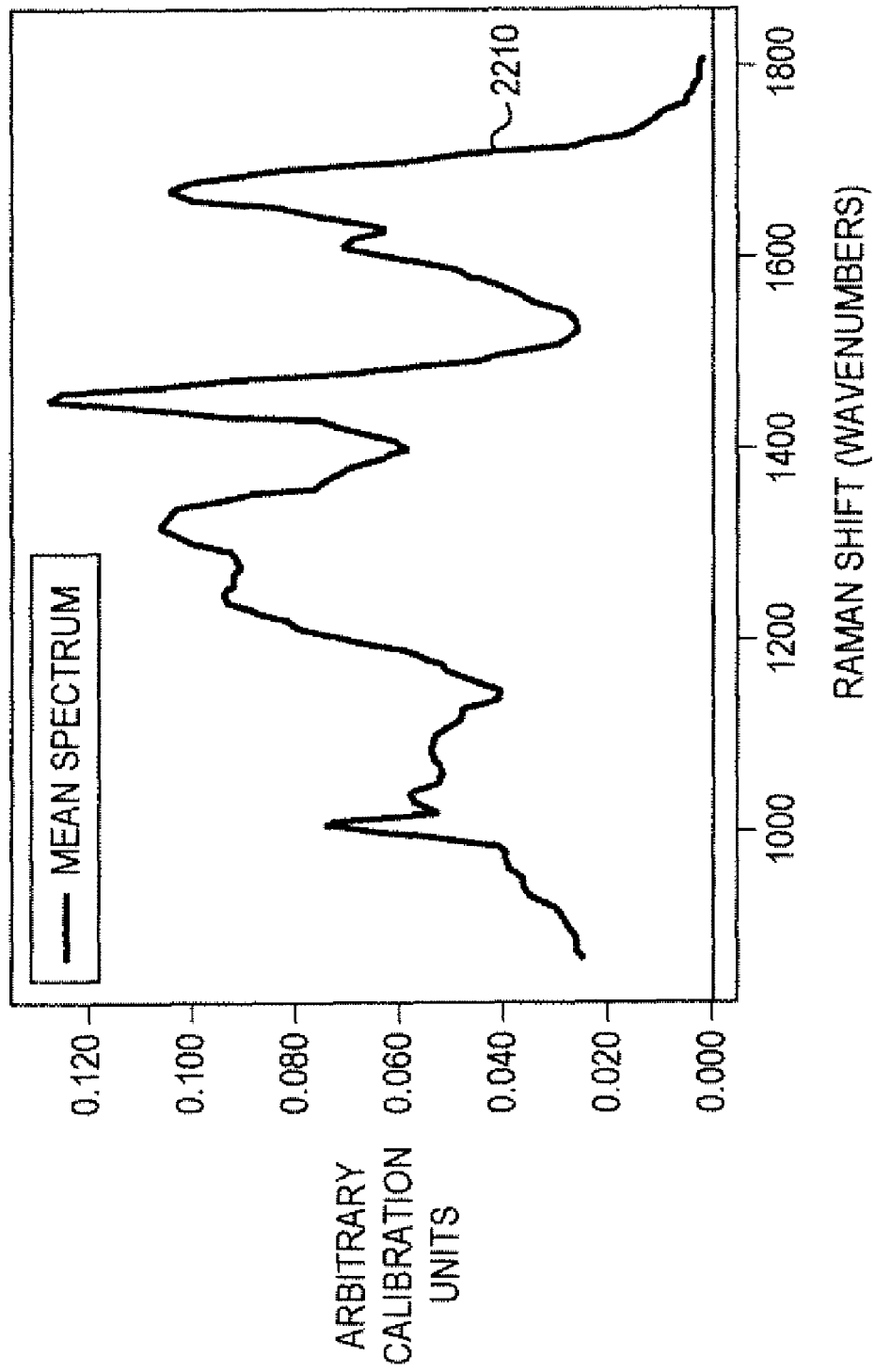
FIG. 22 illustrates a reference mean Raman spectrum for a tissue sample with a Gleason 7 score.
Figure 23:
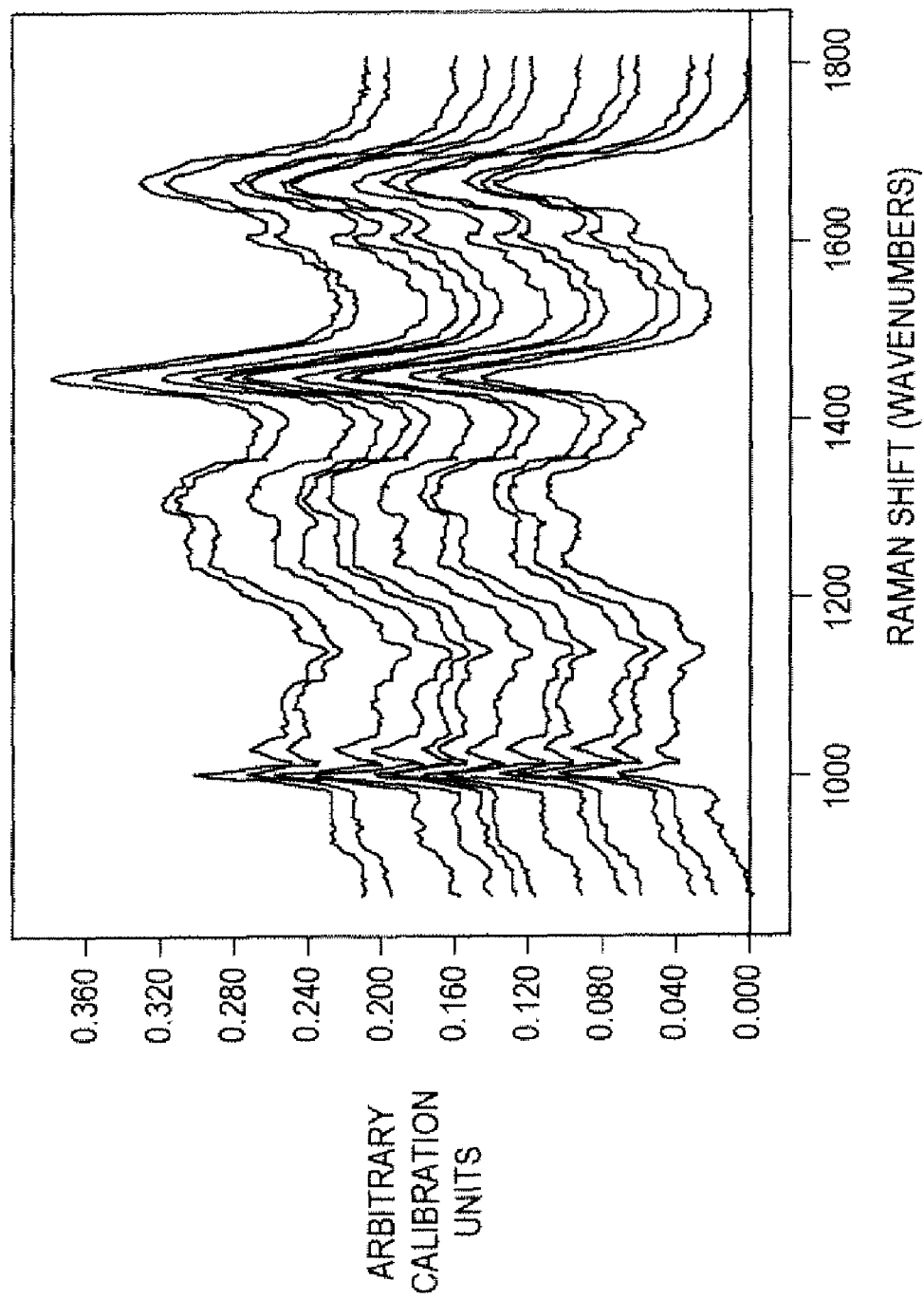
FIG. 23 illustrates twelve (12) Raman spectra for a series of tissue samples having a Gleason 7 score and non-progressive clinical outcome.

This example illustrates an embodiment in which a predetermined vector space, alternatively described as a "classification model," is generated for progressive and non-progressive cancerous prostate tissue. FIG. 22 illustrates a mean Raman spectrum generated a series of samples taken from a cancerous prostate tissue. The tissue had been graded by a pathologist with a Gleason score of 7 where the samples had local areas exhibiting Gleason 3 and Gleason 4 patterns. The series of samples included both progressive and non-progressive cancerous prostate tissue. FIG. 23 illustrates a group of Raman spectra obtained from 12 samples taken from a non-progressive cancerous prostate tissue having a Gleason 7 score. The mean spectrum illustrated in FIG. 22 was subtracted from each spectrum in FIG. 23 to generate a series of difference Raman spectra for non-progressive tissue samples as illustrated in FIG. 24. FIG. 25 illustrates a group of Raman spectra obtained from 12 core-biopsy samples taken from a progressive cancerous prostate tissue having a Gleason 7 score. The mean spectrum illustrated in FIG. 22 was subtracted from each spectrum in FIG. 25 to generate a series of difference Raman spectra for progressive tissue samples as illustrated in FIG. 26.

Principal component analysis was applied to the Raman difference spectra, shown in FIGS. 24 and 26, for the twelve (12) progressive and non-progressive tissue samples. FIG. 27 illustrates the predetermined vector space obtained in this fashion for Gleason 7 progressive tissue and Gleason 7 non-progressive tissue. The vector space, shown in FIG. 27, is a projection of the points in Principal Component space onto a single plane. The points labeled 2720 mathematically describe the reference Raman spectra data sets collected for Gleason 7 progressive tissue. The points labeled 2710 mathematically describe the reference Raman spectra data sets collected for Gleason 7 non-progressive tissue. As illustrated in FIG. 27, the points associated with Raman difference spectra for the non-progressive Gleason 7 tissue samples group in a tight circle 2710 and the points associated with Raman difference spectra for the progressive Gleason tissue samples are in a broader circle 2720 and centered to the left of the plot.

Example 7 demonstrates that well a reference Raman spectrum and Raman spectra obtained for characterized progressive and non-progressive Gleason 7 prostate cancer tissue samples may be used to generate reference Raman difference spectra from which a classification model, based on principal component analysis, may be generated. Using this classification model, it may be possible to provide a diagnosis as to whether a Gleason 7 tissue sample corresponds to a progressive case of prostate cancer or a non-progressive case of prostate cancer.

Example 8

Figure 28:
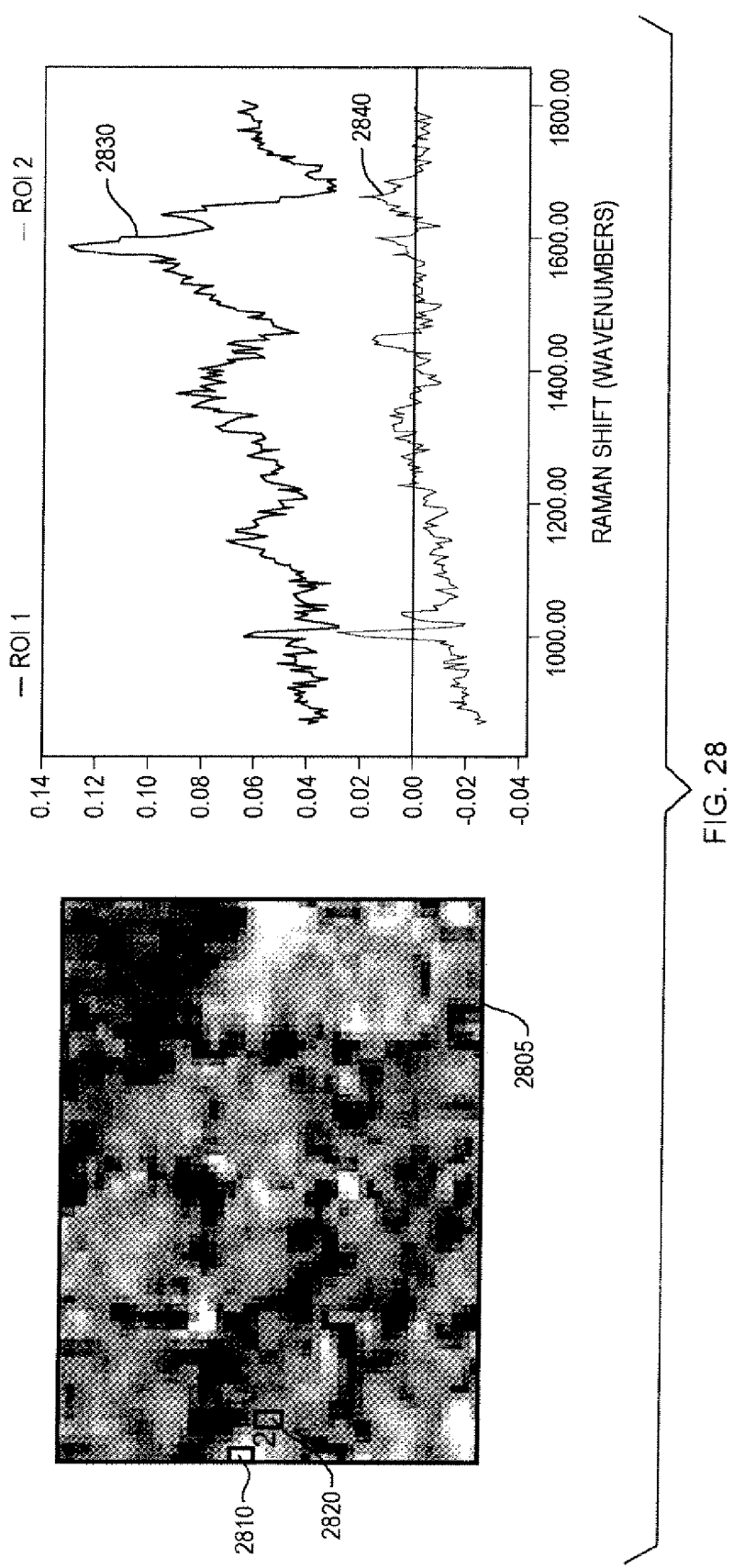
FIG. 28 illustrates a concentration image of a tissue sample with a Gleason 7 score.
Figure 29:
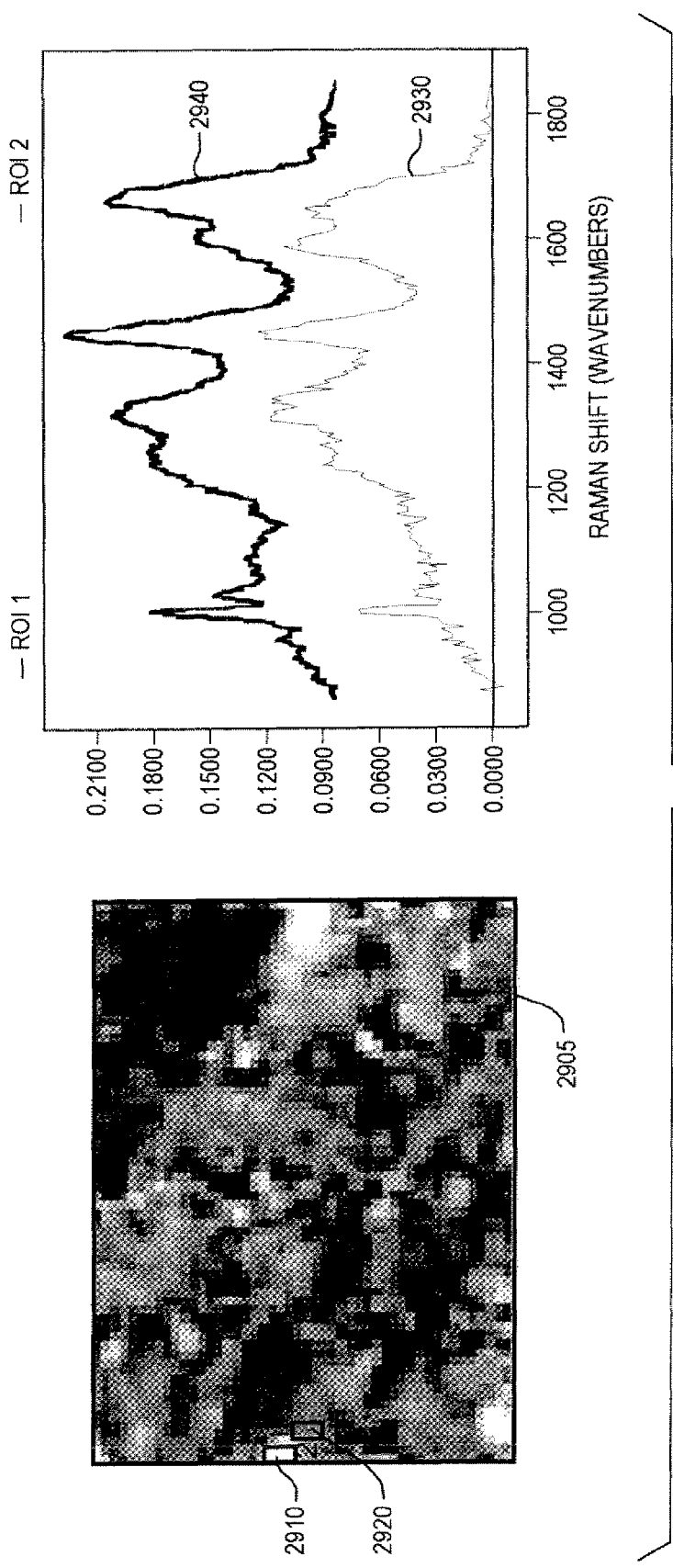
FIG. 29 illustrates a concentration image, after a difference operation using a reference mean Raman spectrum, of a tissue sample with a Gleason 7 score.

This example demonstrates an embodiment where a difference image is generated using a reference Raman spectrum. FIG. 28 illustrates a concentration image 2805 of a Gleason 7 prostate tissue sample. Spatial coordinate 2810 is associated with Raman spectrum 2830 and spatial coordinate 2820 is associated with Raman spectrum 2840. The reference Raman mean spectrum of FIG. 22 was subtracted from each Raman spectra associated with the plurality of x,y spatial coordinated which define concentration image 2805 followed by a normalization procedure so that each difference Raman spectrum is on the same scale. The resulting difference image 2905 is shown in FIG. 29. Raman difference spectrum 2930 is associated with spatial coordinate 2810 and Raman difference spectrum 2940 is associated with spatial coordinate 2820. The data of FIGS. 28 and 29 show that the features of the difference image 2905 are more distinct that the features of the original data image 2805. Also the Raman difference spectra 2930 and 2940 show more distinct differences than Raman spectrum 2830 and 2840, for example in the range of 1600-1800 wave numbers.

This example demonstrates that a difference image may accentuate areas in a tissue sample which may assist in the analysis of a disease type or clinical outcome of a patient associated with the sample.

Example 9

Figure 30:
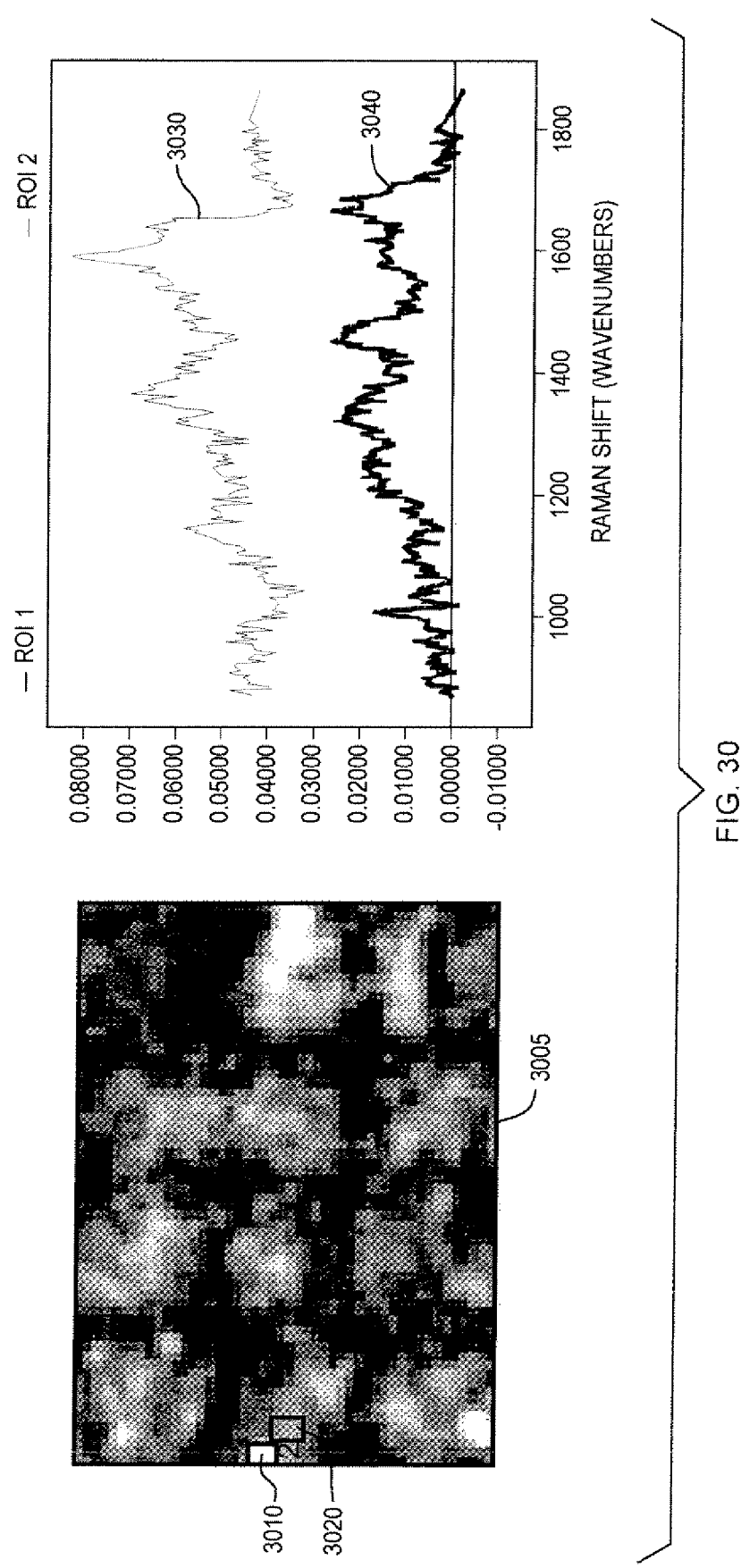
FIG. 30 illustrates a concentration map of a tissue sample with a Gleason 7 score after a difference operation using a mean Raman spectrum obtained for the tissue sample.

This example demonstrates an embodiment where a mean Raman spectrum of a sample, generated by averaging all of the spectra associated with each x,y spatial coordinate of the sample, may be used to generate concentration difference image of the sample by subtracting the difference spectrum from each of the Raman spectra. The sample is a tissue sample having a Gleason 7 score. From the data set associated with the original concentration image, this process will in general remove common features such as instrumental variances or biological difference such as diet or environmental exposure. From the concentration image 2805 illustrated in FIG. 28, a mean Raman spectrum was generated by averaging all of the Raman spectra associated with the plurality of x,y spatial coordinates which describe concentration image 2805. The mean Raman spectrum was then subtracted from each of the Raman spectra associated with each of plurality of x,y spatial coordinates. The resulting concentration difference image 3005 is illustrated in FIG. 30 along with the Raman difference spectrum 3030 associated with x,y spatial coordinate 3010 and Raman difference spectrum 3040 associated with x,y spatial coordinate 3020. In this example, the concentration difference image and each Raman difference spectra represents the spatial areas and molecular components responsible for a disease state and/or clinical outcome.

The present disclosure may be embodied in other specific forms without departing from the spirit or essential attributes of the disclosure. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. A method comprising:
    generating a test Raman data set for an unknown sample;
    providing a reference Raman database containing a plurality of reference Raman data sets and a plurality of reference Raman difference data sets, said reference Raman difference data set being generated by configuring a processor to subtract a first reference Raman data set from a second reference Raman data set,
        said first reference Raman data set being associated with first known sample and associated with one or more of: a first known Gleason score and a first known clinical outcome, and
        a second reference Raman data set being associated with a second known sample and associated with one or more of: second known Gleason score and a second known clinical outcome; and
    providing a diagnosis of whether said unknown sample has a first Gleason score or a second Gleason scores by configuring a processor to compare said test Raman data set to said plurality of reference Raman difference data sets in said reference Raman database using a chemometric technique.

2. The method of claim 1, wherein said chemometric technique is at least one of the following: Principal Component Analysis, Minimum noise function, spectral mixture-resolution, and linear analysis.

3. The method of claim 1, further comprising
    selecting a pre-determined vector space that mathematically describes said plurality of reference Raman difference data sets;
    transforming said test Raman data set into said pre-determined vector space; and
    analyzing a distribution of said transformed test Raman data set in the predetermined vector space to generate said diagnosis.

4. The method of claim 3, wherein said analyzing is performed by using a classification scheme.

5. The method of claim 4, wherein said classification scheme is at least one of the following: Mahalanobis distance, Adaptive subspace detector. Band target entropy method, Neural network, and support vector machine.

6. The method of claim 5, wherein the classification scheme is Mahalanobis distance, and wherein said method further comprising:
    calculating a Mahalanobis distance between said test Raman data set transformed into said vector space and each reference Raman difference data set in said pre-determined vector space; and
generating said diagnosis.

7. The method of claim 1, further comprising based on said comparing, providing a diagnosis of whether said unknown sample has a first disease outcome or a second disease outcome.

8. The method of claim 7, wherein said first known disease outcome corresponds to a progressive disease outcome and said second known disease outcome corresponds to a non-progressive disease outcome.

9. The method of claim 7, wherein said chemometric techniques at least one of the following: Principal Component Analysis, Minimum noise function, spectral mixture resolution, and linear discriminant analysis.

10. The method of claim 9, further comprising:
selecting a pre-determined vector space that mathematically describes said plurality of reference Raman difference data sets;
transforming said test Raman data set into said pre-determined vector space; and
analyzing a distribution of said transformed test Raman data set in the pre-determined vector space to generate said outcome diagnosis.

11. The method of claim 10, wherein said analyzing is performed by using a classification scheme.

12. The method of claim 11, wherein said classification scheme is at least one of the following: Mahalanobis distance, Adaptive subspace detector, Band target entropy method, Neural network, and support vector machine.

13. The method of claim 12, wherein the classification scheme is Mahalanobis distance, and wherein said method further comprising:
calculating a Mahalanobis distance between said test Raman data set transformed into said vector space and each reference Raman difference data set in said pre-determined vector space; and
generating said outcome diagnosis.

14. The method of claim 1, wherein said test Raman data set being associated with a region of interest of said unknown sample, and said associated region of interest defined by a plurality of x,y spatial coordinates.

15. The method of claim 14, wherein said test Raman data set corresponds to a plurality of test Raman spectra, each test Raman spectrum having an associated x,y spatial coordinate of said associated region of interest.

16. The method, of claim 15, wherein said comparing is performed by comparing each test Raman spectrum at each associated x,y spatial coordinate of said associated region of interest to said reference-Raman difference spectrum in said reference Raman database using a chemometric technique.

17. The method of claim 1, wherein is said generating is performed by irradiating said unknown sample with substantially monochromatic light to thereby generate a plurality of scattered photons: and collecting a test Raman dataset based on said scattered photons.

18. The method of claim 1, wherein said test Raman data set is collected at a plurality of Raman shift values ranging from 500 cm.sup.-1 to 3200 µm.sup.-1.

19. The method of claim 1, wherein said test Raman data set is collected at a plurality of Raman shift values ranging from 460 cm.sup-1 to 1850 cm.sup.-1.

20. The method of claim 1, wherein said unknown prostate sample.

21. The method of claim 1, wherein said first Gleason score comprises a Gleason score 7 and the second Gleason score comprises a Gleason score 9.

22. The method of claim 1, wherein said first Gleason score comprises a Gleason score 4 and the second Gleason score comprises a Gleason score 6.

23. The method of claim 1, wherein said first Gleason score comprises a Gleason score 3, and the second Gleason score comprises a Gleason score 5.

24. A system comprising:
a reference database containing a plurality of reference Raman data sets, each reference Raman data set being associated with a known sample and associated with one or more of: a known Gleason score and a known clinical outcome and a plurality of reference Raman difference data sets, an illumination source configured to illuminate an unknown sample with substantially monochromatic light to thereby generate scattered photons;
a spectroscopic device configured to collect a test Raman data set based on said scattered photons;
a machine readable program code containing executable program instructions; and
a processor operatively coupled to the illumination source and the spectroscopic device, and configured to execute said machine-readable program code so as to perform the following: generate a reference Raman difference data set by subtracting a first reference Raman data set from a second reference Raman data set, said first reference Raman data set being associated with first known sample and associated with one or more of a first known Gleason score and a first known clinical outcome, and a second reference Raman dataset being associated with a second known sample and associated with one or more of: a second known Gleason score and a second known clinical outcome;
compare said test Raman data set to said plurality of reference Raman difference data sets, in said reference Raman database using a chemometric technique; and based on said comparison, provide a diagnosis of whether said unknown sample has a first Gleason score or a second Gleason score.

25. The system of claim 24, wherein said processor is further configured to execute said machine readable program code so as to perform the following:
based said comparison, provide a diagnosis of whether said unknown sample has a first disease outcome or a second disease outcome.

26. The system of claim 25, wherein said first known disease; outcome corresponds to a progressive disease outcome and said second known disease outcome corresponds to a non-progressive disease outcome.

27. The system of claim 24, wherein said spectroscopic device includes an imaging spectrometer.

28. The system of claim 24, wherein said spectroscopic device includes a dispersive spectrometer and a fiber array spectral translator.

29. A system comprising:
a reference Raman database containing a plurality of reference Raman datasets and a plurality of reference Raman difference data sets, said reference Raman data set being associated with a known sample and associated with one or more of: a known Gleason score and a known clinical outcome;
means to generate a test Raman data set for an unknown sample;
means to generate a reference Raman difference data set by subtracting a first reference Raman data set from a second reference Raman data set; and
means to provide a diagnosis of whether said unknown sample has a first Gleason score or a second Gleason score by comparing said test Raman dataset to said plurality of reference Raman difference data sets in said reference Raman database using a chemometric technique.

30. A storage medium containing machine readable program code, which, when executed, by a processor, causes said processor to perform the following:
   configure an illumination source to illuminate an unknown sample with substantially monochromatic light to thereby generate scattered photons;
   configure a spectroscopic device to collect a test Raman data set based on said scattered photons;
   generate a reference Raman difference data set by subtracting a first reference Raman dataset and a second reference Raman data set;
   compare said test Raman data set to a plurality of reference Raman difference data sets using a chemometric technique; and
   based on said comparing, provide a diagnosis of whether said unknown sample has a first Gleason score or a second Gleason score.

* * * * *